(12) United States Patent
Hedeen et al.

(10) Patent No.: US 12,196,580 B2
(45) Date of Patent: Jan. 14, 2025

(54) SLOTTED ENCLOSURE FOR MAGNET

(71) Applicant: Magnasphere Corporation, Waukesha, WI (US)

(72) Inventors: Joseph C. Hedeen, Menomonee Falls, WI (US); Anmolbir Sekhon, Menomonee Falls, WI (US)

(73) Assignee: Magnasphere Corporation, Waukesha, WI (US)

( * ) Notice: Subject to any disclaimer, the term of this patent is extended or adjusted under 35 U.S.C. 154(b) by 143 days.

(21) Appl. No.: 18/062,220

(22) Filed: Dec. 6, 2022

(65) Prior Publication Data

US 2024/0183686 A1 Jun. 6, 2024

(51) Int. Cl.
*G01D 5/14* (2006.01)
*H01H 49/00* (2006.01)
*H01H 50/02* (2006.01)
*H01H 50/18* (2006.01)

(52) U.S. Cl.
CPC ............... *G01D 5/14* (2013.01); *H01H 49/00* (2013.01); *H01H 50/02* (2013.01); *H01H 50/18* (2013.01)

(58) Field of Classification Search
None
See application file for complete search history.

(56) References Cited

U.S. PATENT DOCUMENTS

| | | | |
|---|---|---|---|
| 4,903,010 A * | 2/1990 | Greene | G08B 13/08 340/693.11 |
| 5,332,992 A | 7/1994 | Woods | |
| 5,530,428 A | 6/1996 | Woods | |
| 5,673,021 A | 9/1997 | Woods | |
| 5,880,659 A | 3/1999 | Woods | |
| 5,977,873 A | 11/1999 | Woods | |
| 6,087,936 A | 7/2000 | Woods | |
| 6,506,987 B1 | 1/2003 | Woods | |
| 6,603,378 B1 | 8/2003 | Collins | |
| 6,803,845 B2 | 10/2004 | Woods | |
| 7,023,308 B2 | 4/2006 | Woods | |
| RE39,731 E | 7/2007 | Woods | |
| 7,291,794 B2 | 11/2007 | Woods | |
| 7,825,801 B2 | 11/2010 | Woods | |
| 7,944,334 B2 | 5/2011 | Woods | |
| 8,228,191 B2 | 7/2012 | Woods | |
| 8,314,698 B2 | 11/2012 | Woods | |
| 8,487,726 B2 | 7/2013 | Woods et al. | |
| 8,648,720 B2 | 2/2014 | Woods | |

(Continued)

*Primary Examiner* — Jas A Sanghera
(74) *Attorney, Agent, or Firm* — HOVEY WILLIAMS LLP

(57) ABSTRACT

A magnetic switch apparatus for detecting relative movement between first and second members comprises a switch assembly, a magnetic actuator, and an enclosure. The switch assembly mounts on the first member and is configured to shift between states. The magnetic actuator mounts on the second member and is configured to shift the switch assembly between states when the members change positions. The enclosure houses the switch assembly or the magnetic actuator on its respective member and includes a coupling structure configured to decouple from the respective member when the enclosure is shifted in a direction away from the respective member. The direction is at least partially toward the other member when the members are in a close position.

35 Claims, 15 Drawing Sheets

(56) References Cited

U.S. PATENT DOCUMENTS

| | | |
|---|---|---|
| 9,685,289 B1 | 6/2017 | Woods |
| 9,685,290 B1 | 6/2017 | Hedeen |
| 9,704,680 B1 | 7/2017 | Hedeen et al. |
| 9,934,921 B2 | 4/2018 | Hedeen et al. |

* cited by examiner

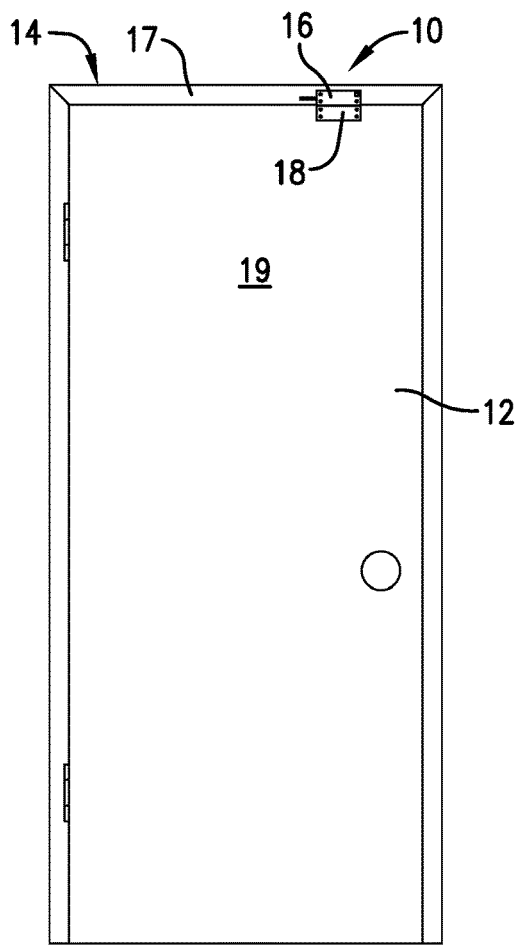
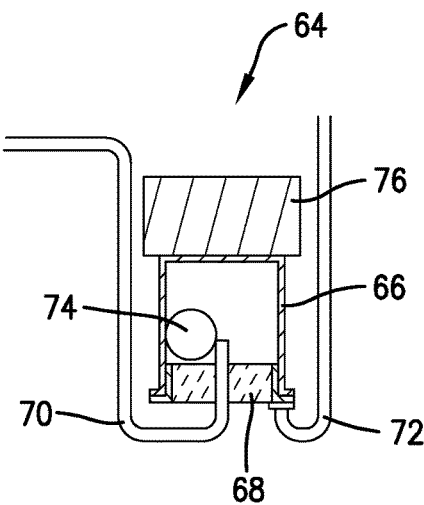
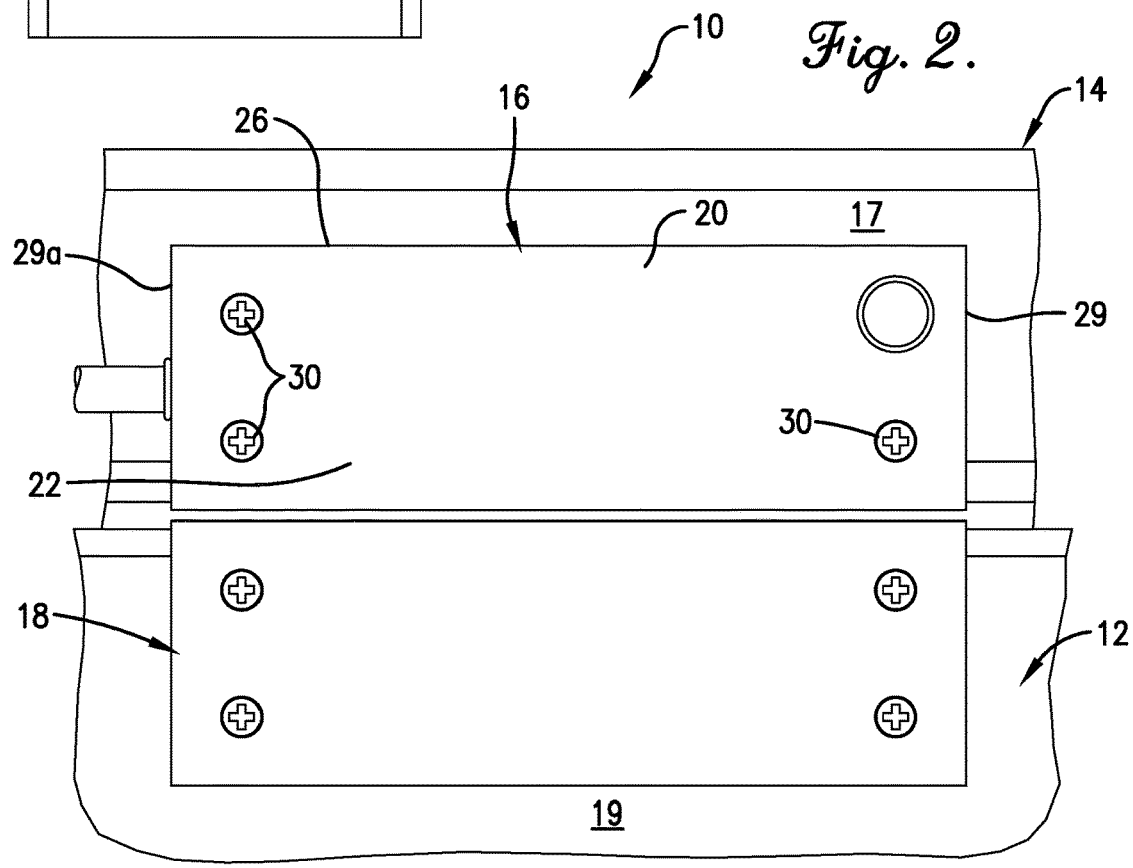

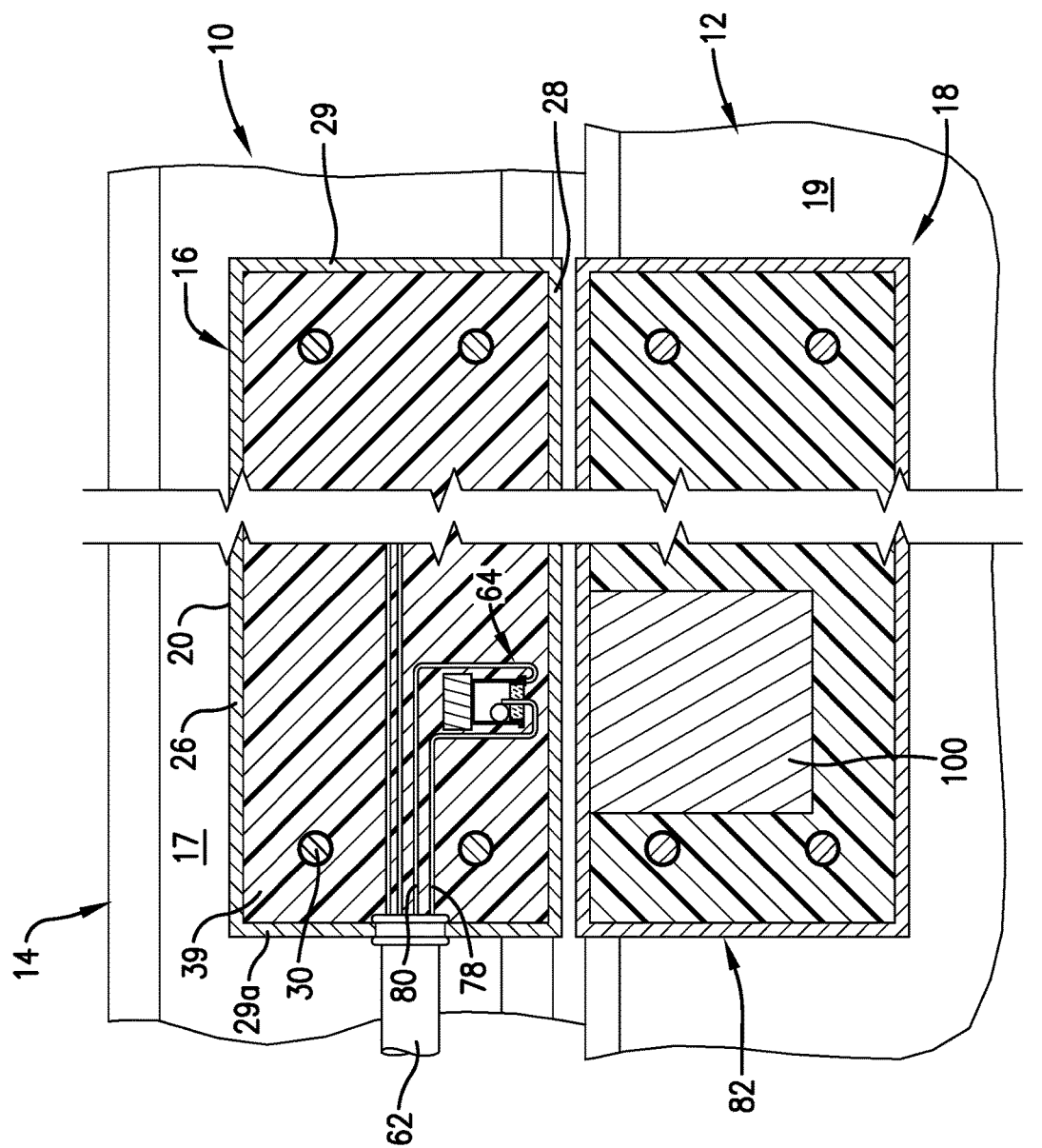

SLOTTED ENCLOSURE FOR MAGNET

BACKGROUND

Alarm systems use magnetic switches attached to doors and/or windows for detecting unauthorized opening thereof. One common type of switch used in these systems is a so-called reed switch. Reed switches are subject to unauthorized manipulation through the use of a strong external defeat magnet. That is, an intruder can place a strong magnet in proximity to the reed switch to hold it closed (or opened depending upon the control scheme), and thereby upon a supposedly protected door or window without triggering the alarm system.

Magnet switches giving improved performance and protection against external magnet manipulation. Such switches generally comprise a magnetic housing with an internal switch ball shiftable between a first position in contact with a pair of switch electrodes, and a second position out of such simultaneous contact. Magnetic ball switches are described in U.S. Pat. Nos. 5,332,992, 5,530,428, 5,673,021, 5,880, 659, 5,977,873, 6,087,936, 6,506,987, 6,603,378, 6,803,845, 7,023,308, RE39,731, 7,291,794, 7,825,801, 7,944,334, 8,228,191, 8,314,698, 8,487,726, 8,648,720, 9,685,289, 9,685,290, 9,704,680, and 9,934,921.

In many instances, it is necessary to mount alarm system components on the surfaces of doors or windows to be protected using fasteners such as screws, rather than having these components embedded within the protected structures. Such surface-mounted alarm systems can be vulnerable because the one or more of the switch components may be detached by the simple expedient of removing the fasteners.

The background discussion is intended to provide information related to the present invention and is not necessarily prior art.

SUMMARY OF THE INVENTION

The present invention solves the above-described problems and other problems by providing magnetic switch apparatuses for detecting relative movement between members and methods of mounting such apparatuses that prevent removal of switch components when the members are in a close position.

A magnetic switch apparatus constructed according to an embodiment of the present invention detects relative movement between a first member and a second member from a close position wherein the first member and the second member are proximal, and an open position wherein the first member and the second member are separated. The magnetic switch apparatus comprises a switch assembly, a magnetic actuator, and an enclosure. The switch assembly mounts on the first member and is configured to shift between a first state and a second state. The magnetic actuator mounts on the second member and is configured to shift the switch assembly between states when the members are in the open position.

The enclosure houses one of the switch assembly or the magnetic actuator on the first member or the second member. The enclosure includes a coupling structure configured to decouple from one of the first member or the second member when at least a portion of the enclosure is shifted in a direction away from the one of the first member or the second member. The direction is at least partially toward the other one of the first member or the second member when the members are in the close position. The coupling structure prevents the enclosure, which houses the switch assembly or actuator, from being removed while they are attached to the members in the close position. This helps prevent intruders from removing, for example, the magnetic actuator and positioning a defeat magnetic actuator proximate to the switch assembly so that magnetic switch apparatus does not detect relative movement of the members.

A magnetic switch apparatus constructed according to another embodiment of the invention detects relative movement between a first member and a second member from a close position wherein the first member and the second member are proximal, and an open position wherein the first member and the second member are separated. The apparatus comprises a switch assembly, a magnetic actuator, and an enclosure. The switch assembly mounts on the first member and is configured to shift between a first state and a second state. The magnetic actuator mounts on the second member and is configured to shift the switch assembly between the first state and the second state when the first member and the second member are in the open position.

The enclosure houses one of the switch assembly or the magnetic actuator and includes an open-ended housing, an interior material positionable within the housing, and a coupling structure configured to couple to the first member or the second member. The coupling structure comprises a channel, an opening, and an anti-drilling material. The channel extends through at least a portion of the housing and the interior material and receives a fastener for securing the enclosure to one of the first member or the second member. The opening is formed in the interior material and is in fluid communication with the channel. The anti-drilling material is operable to be positioned in the channel via the opening.

A magnetic switch apparatus constructed according to another embodiment detects relative movement between a first member and a second member from a close position wherein the first member and the second member are proximal, and an open position wherein the first member and the second member are separated. The apparatus comprises a switch assembly, a magnetic actuator, and an enclosure. The switch assembly mounts on the first member and is configured to shift between a first state and a second state. The magnetic actuator mounts on the second member and is configured to shift the switch assembly between the first state and the second state when the first member and the second member are in the open position.

The enclosure houses one of the switch assembly or the magnetic actuator and includes a back wall, a side wall, and a coupling structure. The back wall is for positioning proximate to one of the first member or the second member. The side wall faces toward the other one of the first member or the second member when the first member and the second member are in the close position. The coupling structure secures the enclosure to the first member or the second member and comprises a back opening, a fastener, an access opening, and a setscrew. The back opening is formed in the back wall. The fastener is for securing to one of the first member or the second member and includes a portion for extending into the back opening. The access opening is formed in the side wall. The setscrew is configured to extend into the access opening and engage the portion of the fastener.

A magnetic switch apparatus constructed according to another embodiment of the invention detects relative movement between a first member and a second member from a close position wherein the first member and the second member are proximal, and an open position wherein the first member and the second member are separated. The apparatus comprises a switch assembly, a first enclosure, a magnetic actuator, and a second enclosure. The switch assembly is configured to shift between a first state and a second state. The first enclosure is for mounting on the first member and houses the switch assembly. The magnetic actuator is configured to shift the switch assembly between the first state and the second state when the first member and the second member are in the open position.

The second enclosure is mounted on the second member and houses the magnetic actuator. The second enclosure includes a coupling structure configured to decouple from the second member when at least a portion of the second enclosure is shifted in a direction away from the second member. The direction is at least partially toward the first enclosure when the first member and the second member are in the close position so that the second enclosure abuts the first enclosure, thereby preventing the coupling structure from decoupling from the second member when the first member and the second member are in the close position.

A magnetic switch apparatus constructed according to another embodiment of the invention detects relative movement between a first member and a second member from a close position wherein the first member and the second member are proximal, and an open position wherein the first member and the second member are separated. The apparatus comprises a switch assembly, a first enclosure, a magnetic actuator, and a second enclosure. The switch assembly is configured to shift between a first state and a second state. The first enclosure is for mounting on the first member and houses the switch assembly. The magnetic actuator is configured to shift the switch assembly between the first state and the second state when the first member and the second member are in the open position.

The second enclosure is mounted on the second member and houses the magnetic actuator. The second enclosure includes an open-ended housing, an interior material slidably held within the housing, and coupling structure for coupling to the second member. The coupling structure includes a channel, an opening, and an anti-drilling material. The channel extends through at least a portion of the open-ended housing and the interior material and is for receiving a fastener for securing the second enclosure to the second member. The opening is formed in the interior material and is in fluid communication with the channel. The anti-drilling material is operable to be positioned in the channel via the opening.

A magnetic switch apparatus constructed according to another embodiment of the invention detects relative movement between a first member and a second member from a close position wherein the first member and the second member are proximal, and an open position wherein the first member and the second member are separated. The apparatus comprises a switch assembly, a first enclosure, a magnetic actuator, and a second enclosure. The switch assembly is configured to shift between a first state and a second state. The first enclosure is for mounting on the first member and houses the switch assembly. The magnetic actuator is configured to shift the switch assembly between the first state and the second state when the first member and the second member are in the open position.

The second enclosure houses the magnetic actuator and includes a back wall, a side wall, and coupling structure. The back wall is for positioning proximate to the second member. The side wall faces the first enclosure when the first member and the second member are in the close position. The coupling structure is for coupling to the second member and comprises a back opening, a fastener, an access opening, and a setscrew. The back opening is formed in the back wall. The fastener is for securing to the second member and includes a portion for extending into the back opening. The access opening is formed in the side wall. The setscrew is configured to extend into the access opening and engage the portion of the fastener.

A method of mounting a magnetic switch apparatus according to an embodiment of the invention is for preventing removal of a magnetic actuator of the magnetic switch apparatus when a first member and a second member are in a close position wherein the first member and the second member are proximal. The method comprises mounting a switch assembly configured to shift between a first state and a second state on the first member; shifting the first member or the second member to an open position wherein the first member and the second member are separated; and attaching an enclosure that houses the magnetic actuator to the second member, the enclosure being attached via a coupling structure configured to decouple from the second member when at least a portion of the enclosure is shifted in a direction away from the second member, the direction being at least partially toward the first member when the first member and the second member are in the close position.

A method of mounting a magnetic switch apparatus according to another embodiment of the invention is for preventing removal of a magnetic actuator of the magnetic switch apparatus when a first member and a second member are in a close position wherein the first member and the second member are proximal. The method comprises mounting a switch assembly configured to shift between a first state and a second state on the first member; shifting the first member or the second member to an open position wherein the first member and the second member are separated; positioning an enclosure of the magnetic actuator on the second member; securing the enclosure to the second member via a fastener extending through an opening formed in a back wall of the enclosure; and inserting an anti-drilling material in a channel in fluid communication with the opening formed in the back wall via an opening formed in an interior material held within the enclosure.

A method of mounting a magnetic switch apparatus according to another embodiment is for preventing removal of a magnetic actuator of the magnetic switch apparatus when a first member and a second member are in a close position wherein the first member and the second member are proximal. The method comprises mounting a switch assembly configured to shift between a first state and a second state on the first member; shifting the first member or the second member to an open position wherein the first member and the second member are separated; inserting a fastener into the second member; positioning an enclosure of the magnetic actuator on the second member so that a portion of the fastener enters a back opening of the enclosure; and securing the enclosure to the second member via a setscrew extending through an access opening on a side wall of the enclosure so that the setscrew engages the fastener, the side wall facing the first member when the first member and the second member are in the close position.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 1 is an elevational view of a door protected by a magnetically actuated surface-mounted alarm assembly in accordance with the invention;

FIG. 2 is an enlarged, fragmentary view illustrating the sections of the surface-mounted alarm assembly of FIG. 1;

FIG. 3 is a sectional view of a preferred magnetically actuatable switch forming a part of the surface-mounted alarm assembly of FIGS. 1 and 2;

FIG. 4 is a vertical sectional view of the sections of the surface-mounted alarm assembly of FIGS. 1 and 2;

Figure 5:
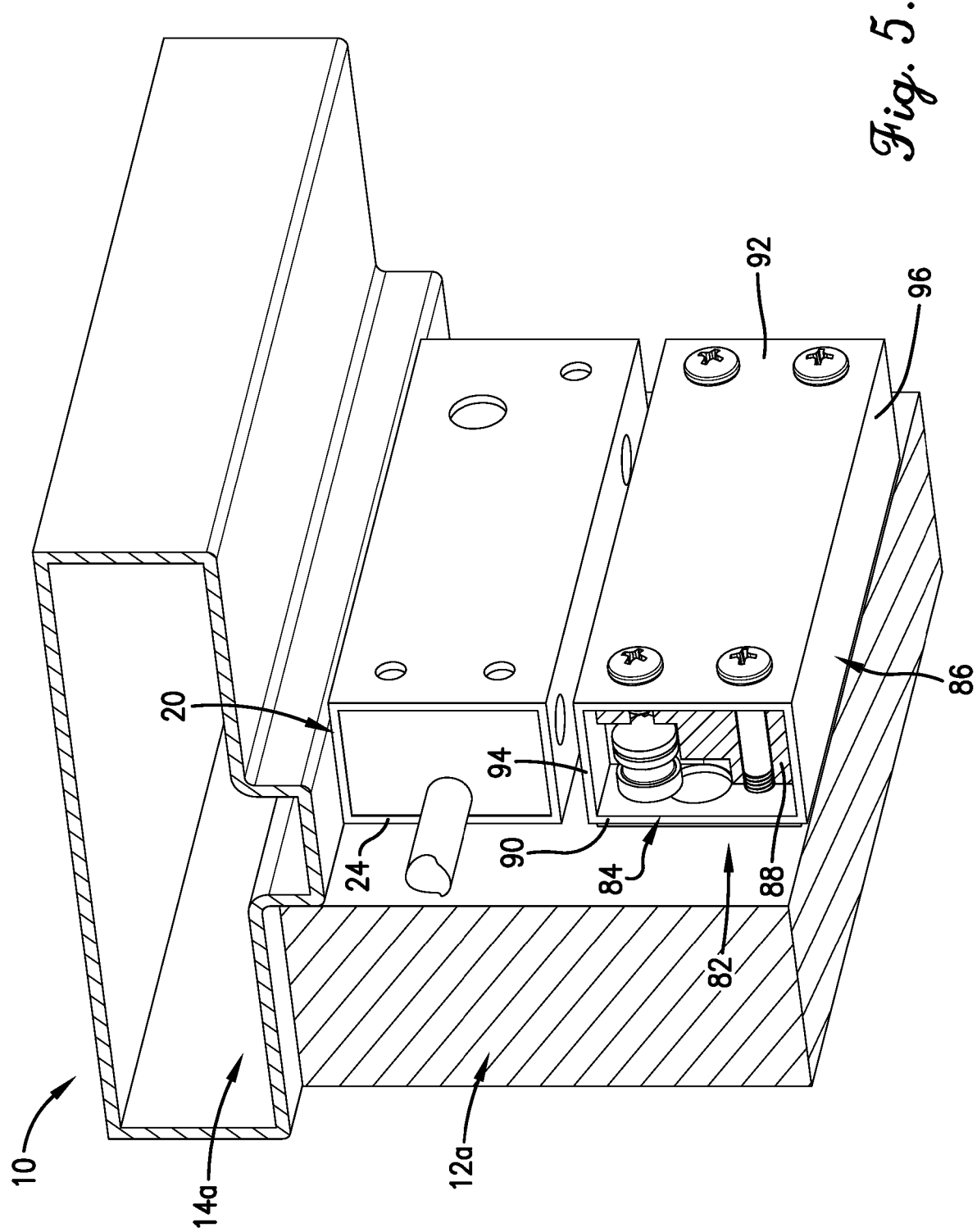
FIG. 5 is a sectional view of an enclosure constructed according to an embodiment of the present invention and forming part of the surface-mounted alarm assembly of FIGS. 1 and 2.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the present technology can include a variety of combinations and/or integrations of the embodiments described herein.

Turning now to FIG. 1, an alarm assembly 10 is illustrated in operative position for protecting a first member, such as a door 12, mounted in a second member, such as a doorframe 14. The alarm assembly 10 broadly includes an alarm section 16 mounted on the outer surface 17 of doorframe 14, as well as a magnetic section 18 mounted on the adjacent outer surface 19 the door 12. Broadly, the assembly 10 is designed to trigger an alarm upon unauthorized opening of door 12. Moreover, the assembly 10 is provided with one or more specialized enclosures which help prevent tempering with the alarm assembly 10 by removal of the alarm section 16 and/or the magnetic section 18. While the alarm section 16 is depicted as being mounted on the doorframe 14 and the magnetic section 18 on the door 12, the alarm section 16 may be mounted on the door 12, and the magnetic section 18 may be mounted on the doorframe 14 without departing from the scope of the present invention. Additionally, the first and second members may be any structure capable of relative movement, including a window, cabinet, drawer, or the like.

Turning to FIGS. 2 and 4, the alarm section 16 includes a box-like enclosure or housing 20 having an outer wall 22, inner wall 24 (shown in FIG. 5), top and bottom walls 26, 28, and end walls 29, 29a. The inner wall 24 may abut the surface 17. A plurality of long fasteners 30 extend through suitable openings provided in the walls 22, 24 and through the outer surface 17 of doorframe 14 and into the interior of the latter. The interior of section 16 has a synthetic fill 39 which fills the entirety of the section save for the operative and connective components therein.

The section 16 includes a movement sensor 64 located adjacent the bottom wall 28 of housing 20. The sensor 64 is preferably a Magnasphere magnetically actuatable proximity switch of the type illustrated and described in FIG. 3 of U.S. Pat. No. 7,944,334. As shown in FIG. 3 of the present application, the sensor or switch 64 includes a conductive housing 66 with a dielectric plug 68 and first and second switch elements 70 and 72. An electrically conductive, magnetically responsive, shiftable metallic ball 74 is within housing 66 and is moveable between respective switch positions where the ball 74 is in simultaneous contact with the switch elements 70, 72, and out of such simultaneous contact. However, in lieu of a biasing ring, the sensor or switch 64 has an associated magnet 76 located adjacent the upper surface of housing 66. The magnet 76 is of sufficient strength to move ball 74 to its position out of simultaneous contact with switch elements 70, 72, in the absence of a stronger ambient magnetic field. Turning back to FIG. 4, the sensor or switch 64 also has leads 78 and 80 respectively connected with the switch elements 70, 72 and passing through housing 20 into conduit 62. The leads 78, 80 form a part of an alarm circuit.

The magnetic section 18 includes an enclosure 82 housing a magnetic actuator, such as a large magnet 100 located, when the door 12 is closed, directly beneath the sensor or switch 64. In this position, the magnet 100 is of sufficient strength to overcome the bias of magnet 76, thus moving ball 74 to the switch position where the ball 74 is in simultaneous contact with housing 66 (and thus switch element 72) and central switch element 70. However, the switch 64 and magnetic actuator 100 may have any number of configurations, including one or more opposite magnetic polarities, without departing from the scope of the present invention.

In the event that door 12 is opened while the alarm assembly 10 is armed, movement of the magnet 100 away from sensor or switch 64 causes the ball 74 to move under the influence of magnet 76, to thus change the switch condition of sensor or switch 64. This generates an alarm signal indicating the unauthorized door opening. However, an intruder may seek to defeat the alarm assembly 10 by removing the alarm section 16 from doorframe 14 and/or the magnetic section 18 from the door 12.

Turning to FIG. 5, the alarm assembly 10 is depicted as attached to another door 12a and doorframe 14a with a portion of the enclosure 82 of the magnetic section 18 cut away for viewing within the enclosure 82. The enclosure 82 includes one or more coupling structures 84 configured to decouple from the door 12a when at least a portion of the enclosure 82 is shifted in a direction away from the door 12a. The direction is at least partially toward the doorframe 14a when the door 12a and the doorframe 14a are in the close position. This makes it so that the enclosure 82 is inhibited from being removed when attached to the door 12a in the close position: if the enclosure 82 was shifted along the direction while the door 12a is closed, the enclosure 82 would abut the housing 20.

The enclosure 82 includes a housing 86 and an interior material 88, such as synthetic material. The housing 86 includes a back wall 90, a front wall 92 opposed to the back wall 90, an upper side wall 94, and a lower side wall 96. The back wall 90 is for positioning proximate to the door 12a. The first wall 92 is spaced apart from the back wall 90. The upper side wall 94 extends from the back wall to connect the front and back walls 92, 90. The upper side wall 94 faces the housing 20 of the alarm section 16 when the door 12a and the doorframe 14a are in the close position. The lower side wall 96 also extends from the back wall 90 to front wall 92. The interior material 88 may also comprise synthetic fill that fills the entirety of the section save for the operative and connective components therein.

Figure 6:
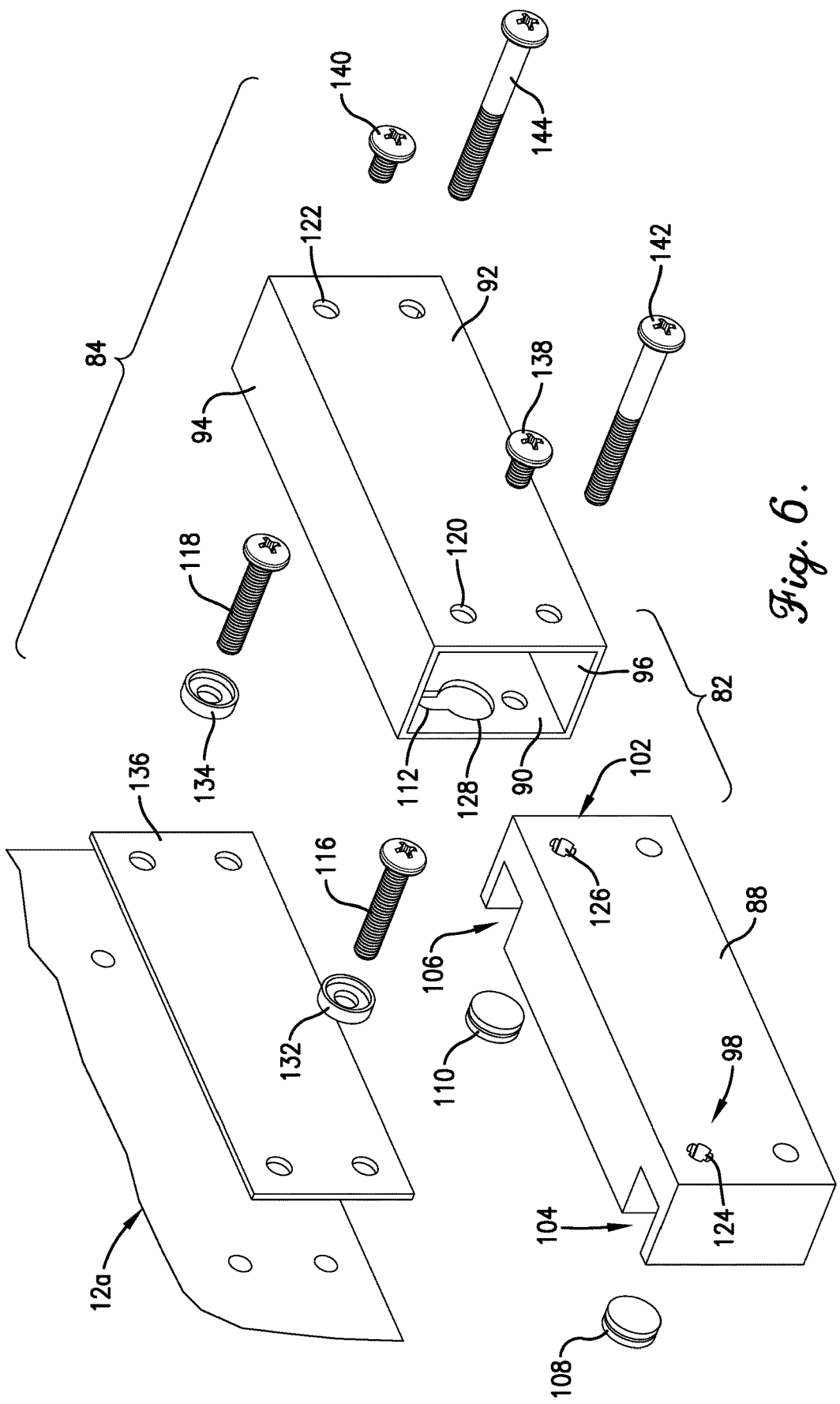
FIG. 6 is an exploded frontal view of the enclosure of FIG. 5.
Figure 7:
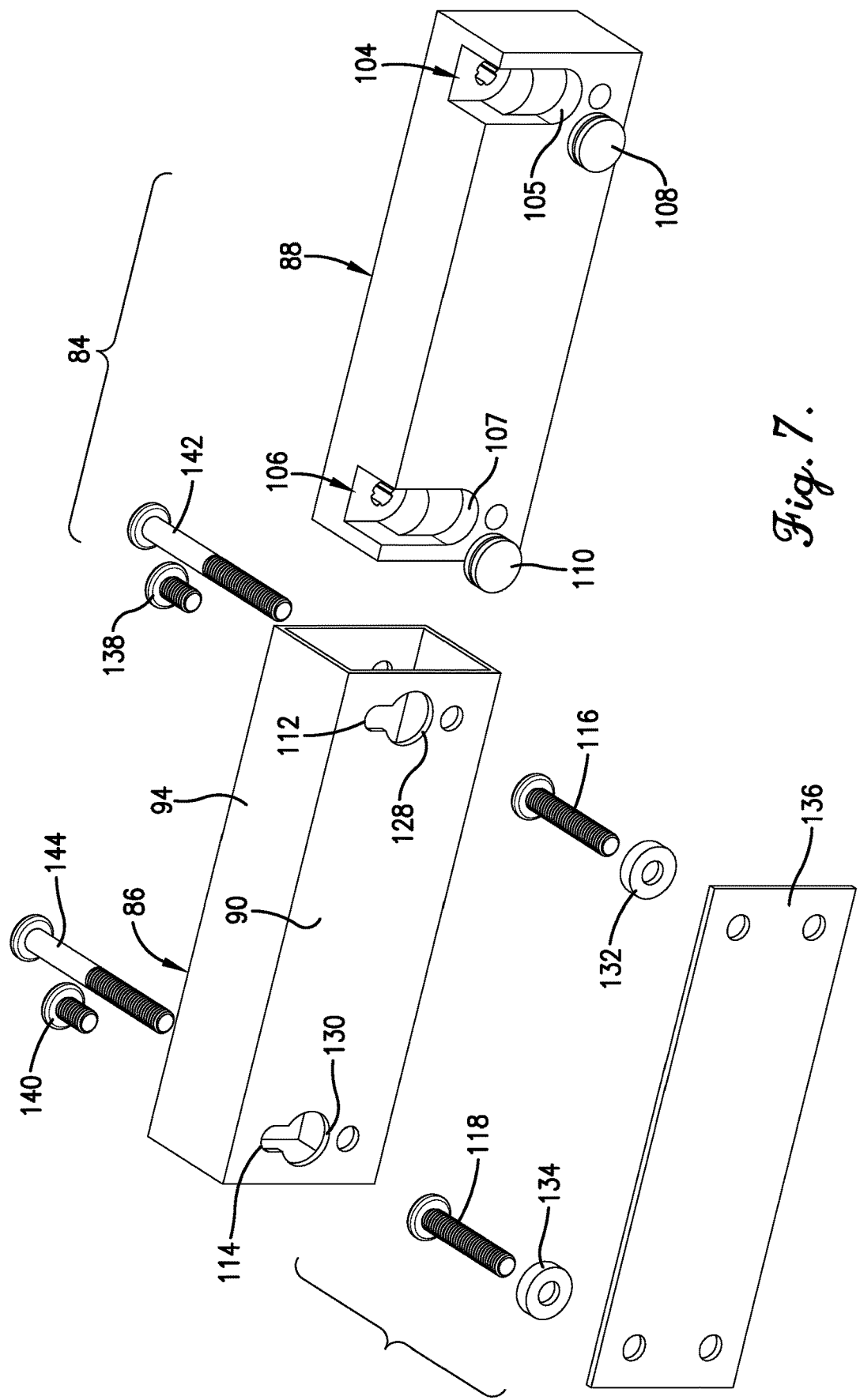
FIG. 7 is an exploded rear view of the enclosure of FIG. 5.

Turning to FIGS. 6 and 7, the coupling structure 84 includes a pair of channels 98, 102, openings 104, 106, anti-drilling materials 108, 110, and slots 112, 114 (depicted in FIG. 7). The channels 98, 102 may extend through the housing 86 and the interior material 88 for receiving and/or accessing fasteners 116, 118 for securing the enclosure 82 to the door 12a. The channels 98, 102 may be defined by the openings 120, 122 in the front wall 92, portions of the slots 112, 114 in the back wall 90 of the housing 86, and cavities 124, 126 in the interior material 88.

The openings 104, 106 are formed in the interior material 88 and are in fluid communication with the channels 98, 102. The openings 104, 106 face upwards toward the upper side wall 94 and may include slotted areas 105, 107 (depicted in FIG. 7) that allow fastener heads to move within the housing 86 so that portions of the fasteners 116, 118 can enter the slots 112, 114. The anti-drilling materials 108, 110 are operable to be positioned in the channels 98, 102 via the openings 104, 106 when the interior material 88 is removed from the housing 86.

The slots 112, 114 may be formed in the back wall 90 of the housing 86 in alignment with the channels 98, 102. The slots 112, 114 may extend upwards toward the upper side wall 94 from openings 128, 130 formed in the back wall 90 that are operable to receive portions of the fasteners 116, 118, such as the fastener heads. The fasteners 116, 118 may be partially inserted into to the door 12a so that portions of the fasteners 116, 118 protrude from the door 12a, the fastener heads may be inserted into the openings 128, 130, and the housing 86 may be pushed downwards so that the portions of the fasteners 116, 118 slide into the slots 112, 114. This makes it so that the housing 86 has to be pushed upwards toward the alarm section 16 to be removed. Thus, when the alarm assembly 10 is installed and the door 12a and the doorframe 14a are proximate or in the close position, the enclosure 82 is inhibited from being removed because the housing 86 would abut the housing 20 of the alarm section 16. In some embodiments, the fasteners 116, 118 may include washers 132, 134 that are sandwiched between the fastener heads and the back wall 90 of the housing 86. Additionally, the alarm assembly 10 may include a spacer plate 136 for securing between the back wall 90 of the housing 86 and the door 12a.

When the housing 86 is coupled to the fasteners 116, 118 against the wall 12a or the spacer plate 136, the fasteners 116, 118 may be tightened or loosened by accessing them via the channels 98, 102 defined by the holes 120, 122 formed in the front wall 92 of the housing 86. They may also be accessed when the interior material 88 is held within the housing 86 without the anti-drilling materials 108, 110 via the channels 98, 102 defined by the holes 120, 122 and the cavities 124, 126. However, when the anti-drilling materials 108, 110 are positioned in the openings 104, 106 and the interior material 88 is placed in the housing 86, the anti-drilling materials 108, 110 block the channels 98, 102, thereby preventing access to the fasteners 116, 118. The anti-drilling materials 108, 110 may comprise one or more steel plates that help prevent an intruder from drilling or otherwise damaging the fasteners 116, 118. Additionally, cosmetic fasteners 138, 140 may be fastened into openings 120, 122 and secure the interior material 88 within the housing 86. Additional fasteners 142, 144 may be inserted into the enclosure 82 and fastened to the door 12a, thereby helping secure the enclosure 82 to the door 12a.

While the enclosure 82 is depicted as housing the magnet 100, the enclosure 82 may additionally or alternatively house the switch 64 without departing from the scope of the present invention. For example, the enclosure 82 may house only the switch 64, or the alarm assembly 10 may include two enclosures 82—one for the magnet 100 and one for the switch 64. In other words, the housing 20 may have similar coupling structure 84 as enclosure 82 for coupling the alarm section 16 to the doorframe 14.

Figure 8:
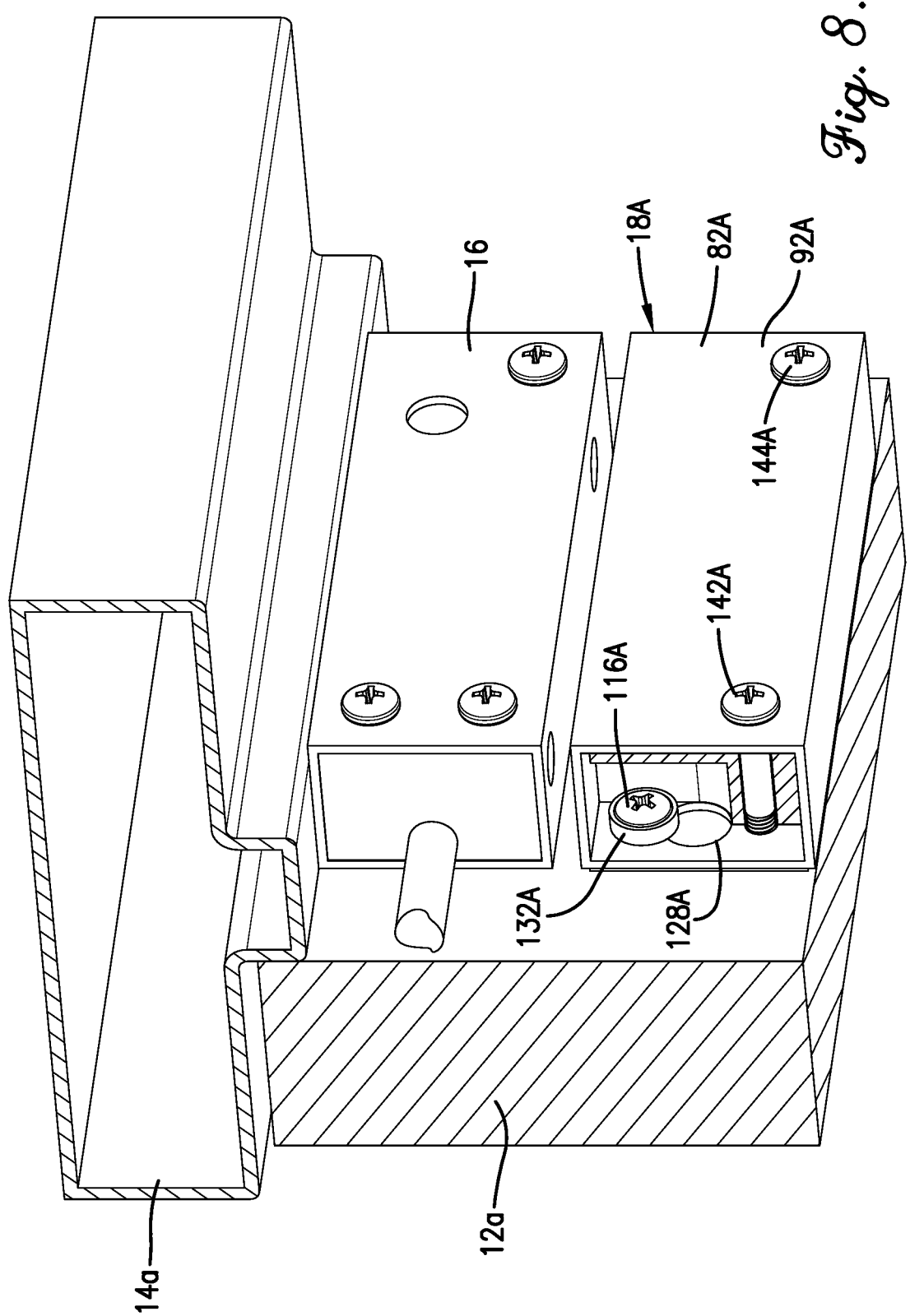
FIG. 8 is a sectional view of an enclosure constructed according to another embodiment of the present invention.
Figure 9:
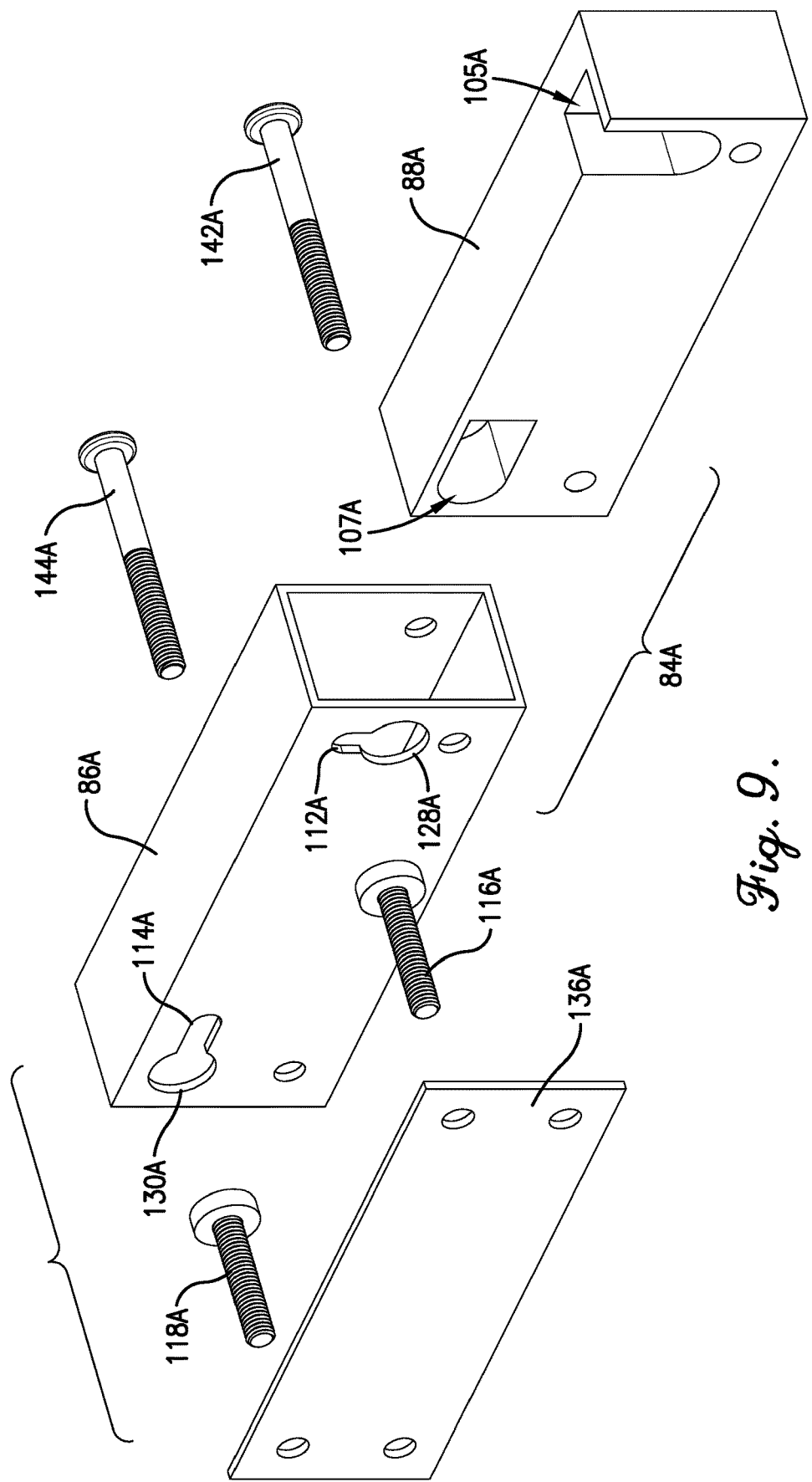
FIG. 9 is an exploded rear view of the enclosure of FIG. 8.

An enclosure 82A constructed in accordance with another embodiment of the invention is shown in FIGS. 8 and 9. The enclosure 82A may comprise substantially similar components as enclosure 82; thus, the components of enclosure 82A that correspond to similar components in enclosure 82 have an 'A' appended to their reference numerals. The principal difference between enclosure 82A and enclosure 82 is that one of the slots 114A of the coupling structure 84A is not parallel to the other slot 112A (as depicted in FIG. 9) so that the enclosure 82A must be pivoted upwards to remove it from the door 12a. Additionally, the front wall 92A may only include openings for receiving the bottom fasteners 142A, 144A, e.g., the enclosure 82A may not include the openings 120, 122 or channels 98, 102 of enclosure 82, as depicted in FIG. 8.

Turning to FIG. 9, the slot 114A may extend generally parallel to the upper side wall 94A from the opening 130A or perpendicular to the other slot 112A. The other slot 112A extends toward the upper side wall 94A from opening 128A. While the slots 112A, 114A are depicted as being normal to one another, the slots may be angled relative to one another any number of ways without departing from the scope of the present invention. The slots 112A, 114A are angled relative to one another so that fasteners 116A, 118A cannot be removed simultaneously and so that at least a portion of the enclosure 82A must be moved in a direction toward the alarm section 16 when the door 12 and the doorframe 14 are in the close position. The interior material 88A may include slotted areas 105A, 107A for allowing the fasteners 116A, 118A to move within the housing 86A so that portions of the fasteners 116A, 118A can enter or exit the slots 112A, 114A. The slotted area 107A may be defined in the interior material 88A so as to extend in a direction parallel to the slot 114A.

Thus, the enclosure 82A is operable to be installed on the door 12a by securing the fasteners 116A, 118A onto the door with lengths of the fasteners 116A, 118A protruding from the spacer plate 136A for inserting into the slots 112A, 114A. The enclosure 82A may installed by positioning the first fastener 118A into the opening 130A and shifting the enclosure 82A in a first direction so that the portion of the fastener 118A protruding from the spacer plate 136A slides into slot 114A. Then the enclosure 82A is positioned so that the other fastener 116A enters the opening 128A, and then the enclosure 82A is pivoted downward about fastener 118A so that fastener 116A goes into slot 112A. The other fasteners 142A, 144A may then be used to further secure the enclosure 82A.

The relative orientations of the slots 112A, 114A require the enclosure 82A to be pivoted upwards in order for the enclosure 82A to be removed from the door 12a. Thus, when the enclosure 82A is attached and the door 12a and doorframe 14a are in close positions, the enclosure 82A is inhibited from being removed because when pivoting upwards, the enclosure 82A would be blocked by the alarm section 16.

Figure 10:
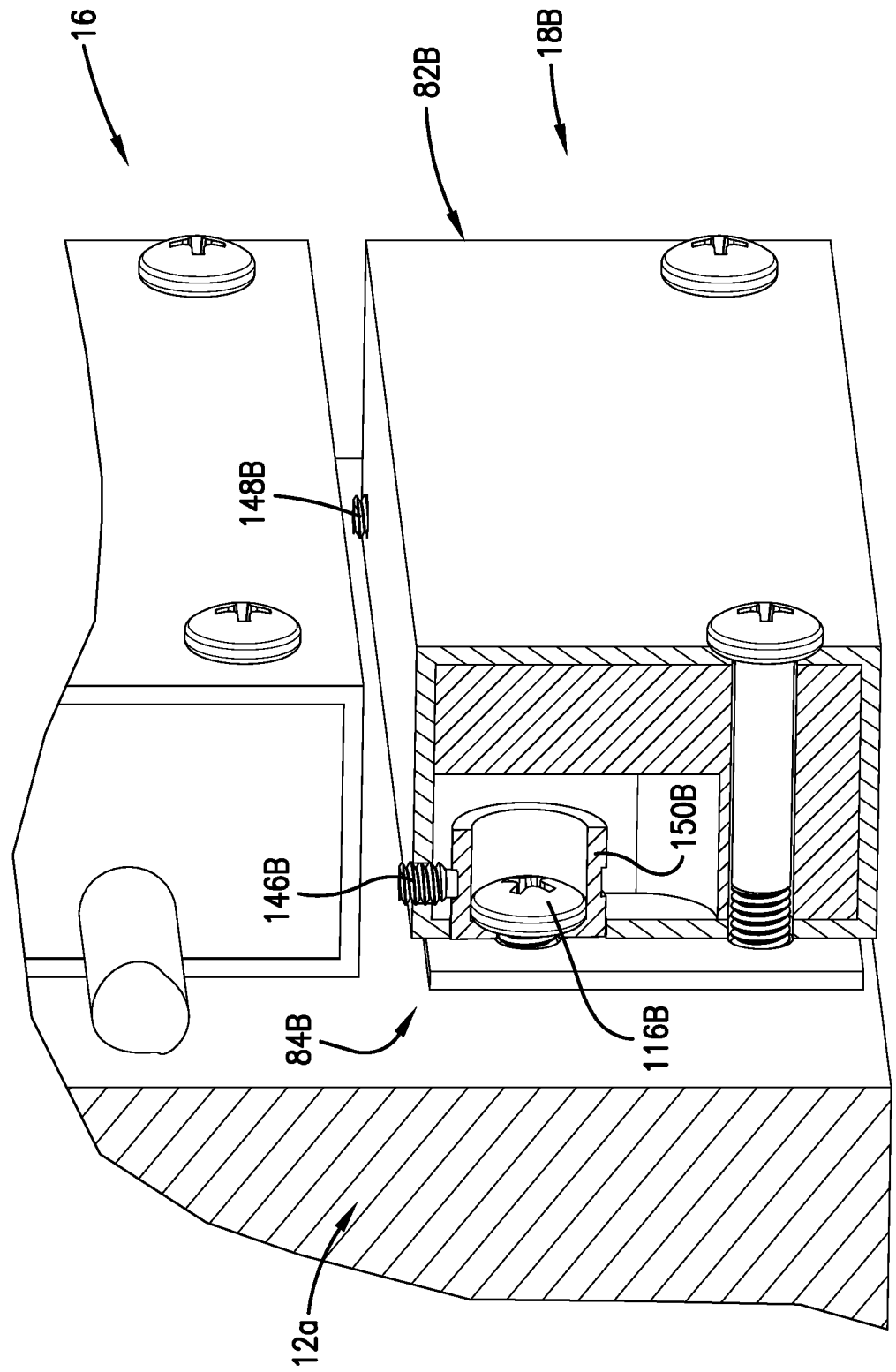
FIG. 10 is a sectional view of an enclosure constructed according to another embodiment of the present invention.
Figure 11:
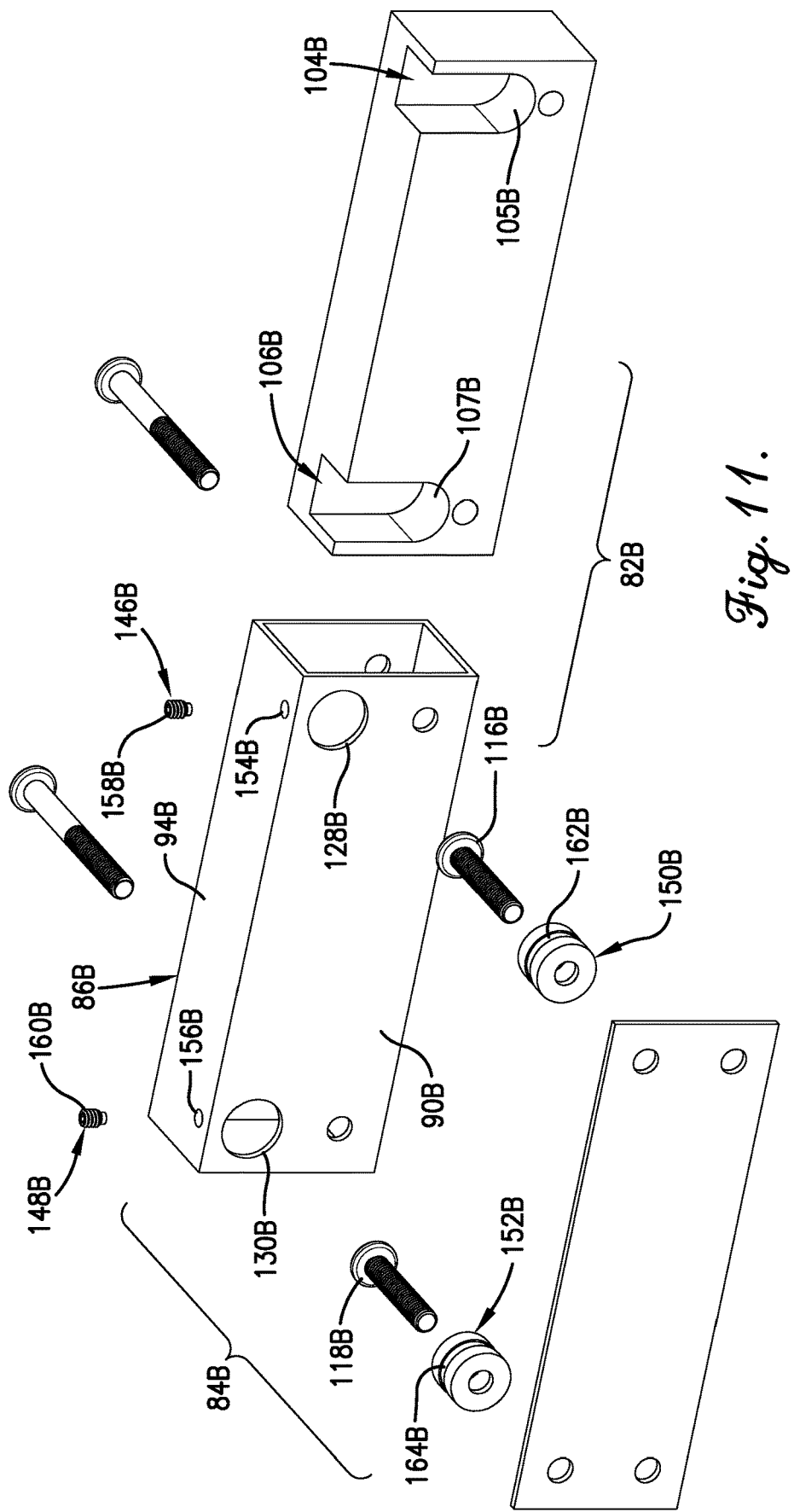
FIG. 11 is an exploded rear view of the enclosure of FIG. 10.
Figure 12:
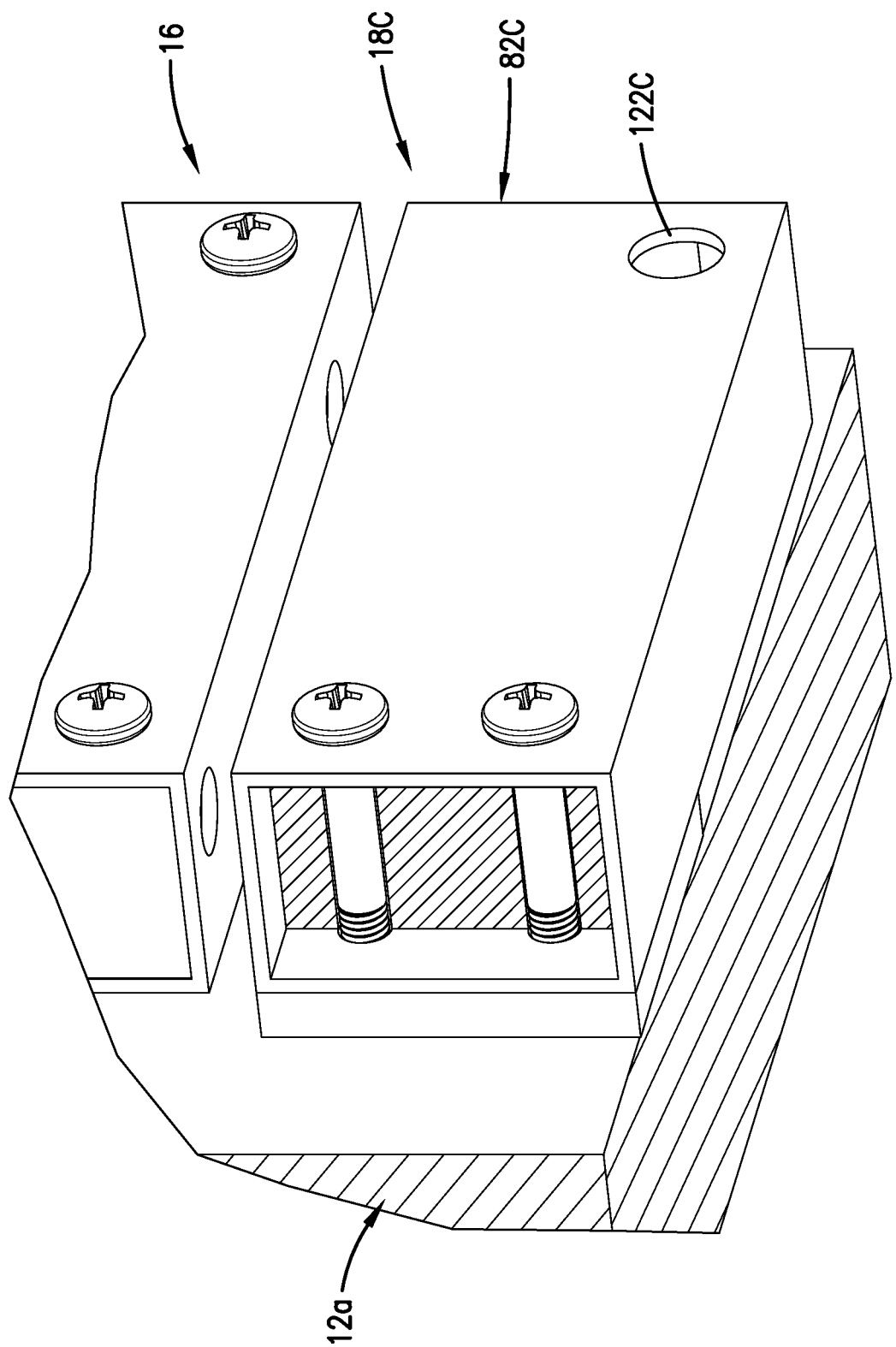
FIG. 12 is a sectional view of an enclosure constructed according to another embodiment of the present invention.
Figure 13:
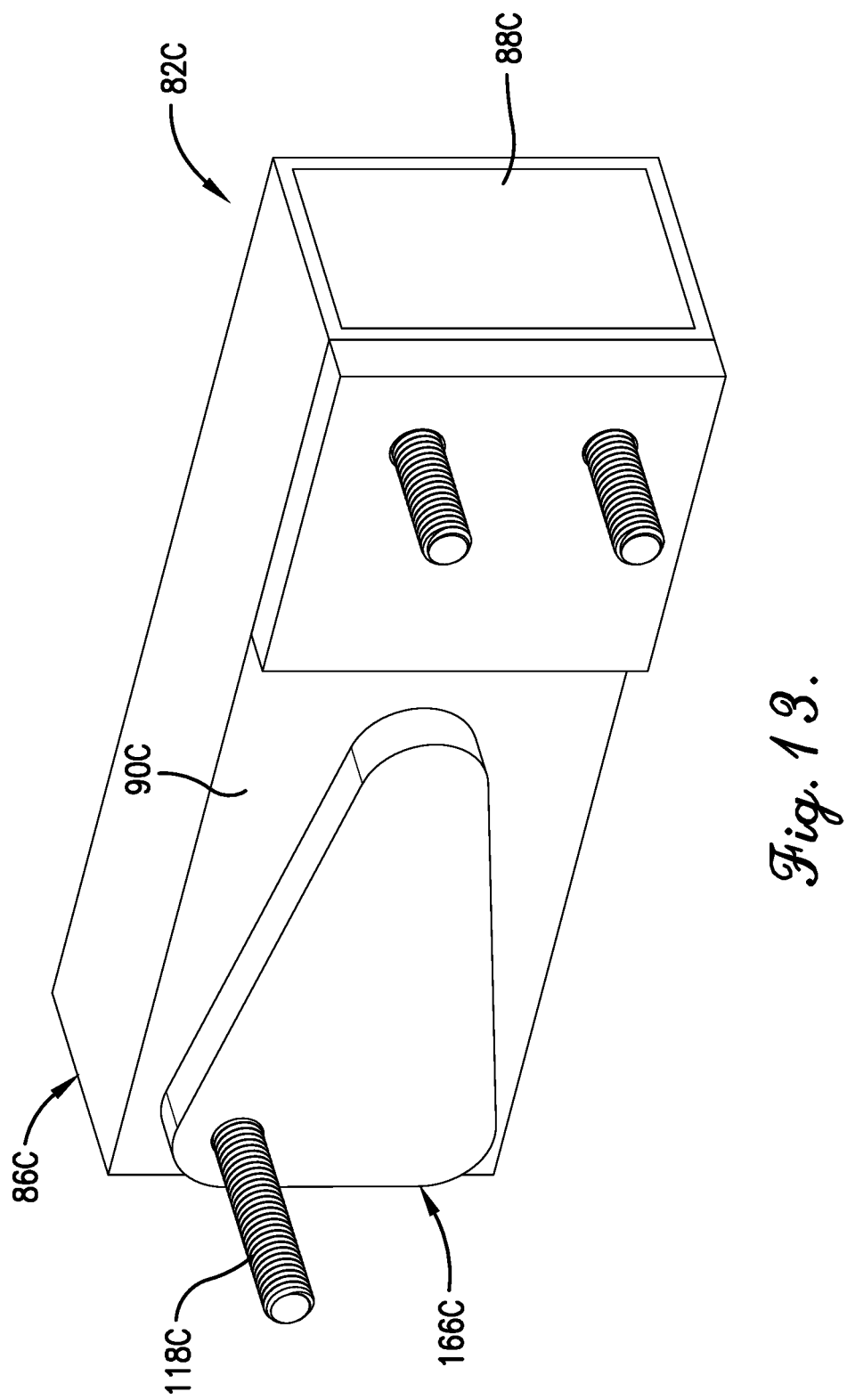
FIG. 13 is a rear perspective view of the enclosure of FIG. 12 with a tilt link at a first position.

An enclosure 82B constructed in accordance with another embodiment of the invention is shown in FIGS. 10 and 11. The enclosure 82B may comprise substantially similar components as enclosure 82; thus, the components of enclosure 82B that correspond to similar components in enclosure 82 have a 'B' appended to their reference numerals. The principal difference between enclosure 82B and enclosure 82 is that instead of the coupling structure 84B comprising slots 112, 114 for securement to the door 12a, the coupling structure 84B comprises setscrews 146B, 148B that engage collars 150B, 152B on the fasteners 116B, 118B. Additionally, similar to enclosure 82A, enclosure 82B may not have openings in the front wall 92B for accessing fasteners 116B, 118B. This further helps prevent tampering with the fasteners 116B, 118B.

Turning to FIG. 11, the coupling structure 84B includes openings 128B, 130B formed in the back wall 90B of the housing 86B for receiving the fasteners 116B, 118B and their collars 150B, 152B. The fasteners 116B, 118B are operable to secure the collars 150B, 152B on the door 12a so that they may be received into the openings 128B, 130B. The coupling structure 84B may further include access openings 154B, 156B formed in the upper side wall 94B of the housings 86B for receiving the setscrews 146B, 148B. With the access openings 154B, 156B on the wall 94B facing the housing of the alarm section 16, the setscrews 146B, 148B are prevented from being easily accessed when the alarm assembly is installed and the door 12a and doorframe 14a are in the close position.

The setscrews 146B, 148B are operable to be fastened into the access openings 154B, 156B and engage a portion of the fasteners 116B, 118B, such as the collars 150B, 152B. As used herein and throughout, unless defined differently, "engage" means any kind of relative fixation between the setscrews 146B, 148B and the fasteners 116B, 118B. For example, the setscrews 146B, 148B may actuate intermediate structure that abuts the fasteners 116B, 118B without departing from the scope of the present invention. The setscrews 146B, 148B may include top surfaces 158B, 160B and have lengths so that the top surfaces 158B, 160B are flush with the upper side wall 94B or sunken below the top surface of the upper side wall 94B within the access openings 154B, 156B when the setscrews 146B, 148B are engaged with the collars 150B, 152B. Each of the collars 150B, 152B may include circumferentially extending grooves 162B, 164B for receiving an end of one of the setscrews 146B, 148B.

The interior material 88B includes openings 104B, 106B for allowing the setscrews 146B, 148B to engage the collars 150B, 152B and slotted areas 105B, 107B that provide space for the collars 150B, 152B to enter the housing 86B.

Turning to FIGS. 12-17, an enclosure 82C constructed in accordance with another embodiment of the invention is shown. The enclosure 82C may comprise substantially similar components as enclosure 82; thus, the components of enclosure 82C that correspond to similar components in enclosure 82 have a 'C' appended to their reference numerals. The principal difference between enclosure 82C and enclosure 82 is that the coupling structure 84C comprises a tilt link 166C (shown in FIG. 13) pivotally attached to the back wall 90C of the housing 86C. The tilt link 166C may be secured to the door 12a via fastener 118C that is only accessible via the opening 122C in the front wall 92C of the housing 86C when the enclosure 82C is tilted upwards, or otherwise tilted in a direction that would be inhibited when the door and doorframe are in the close position.

Figure 14:
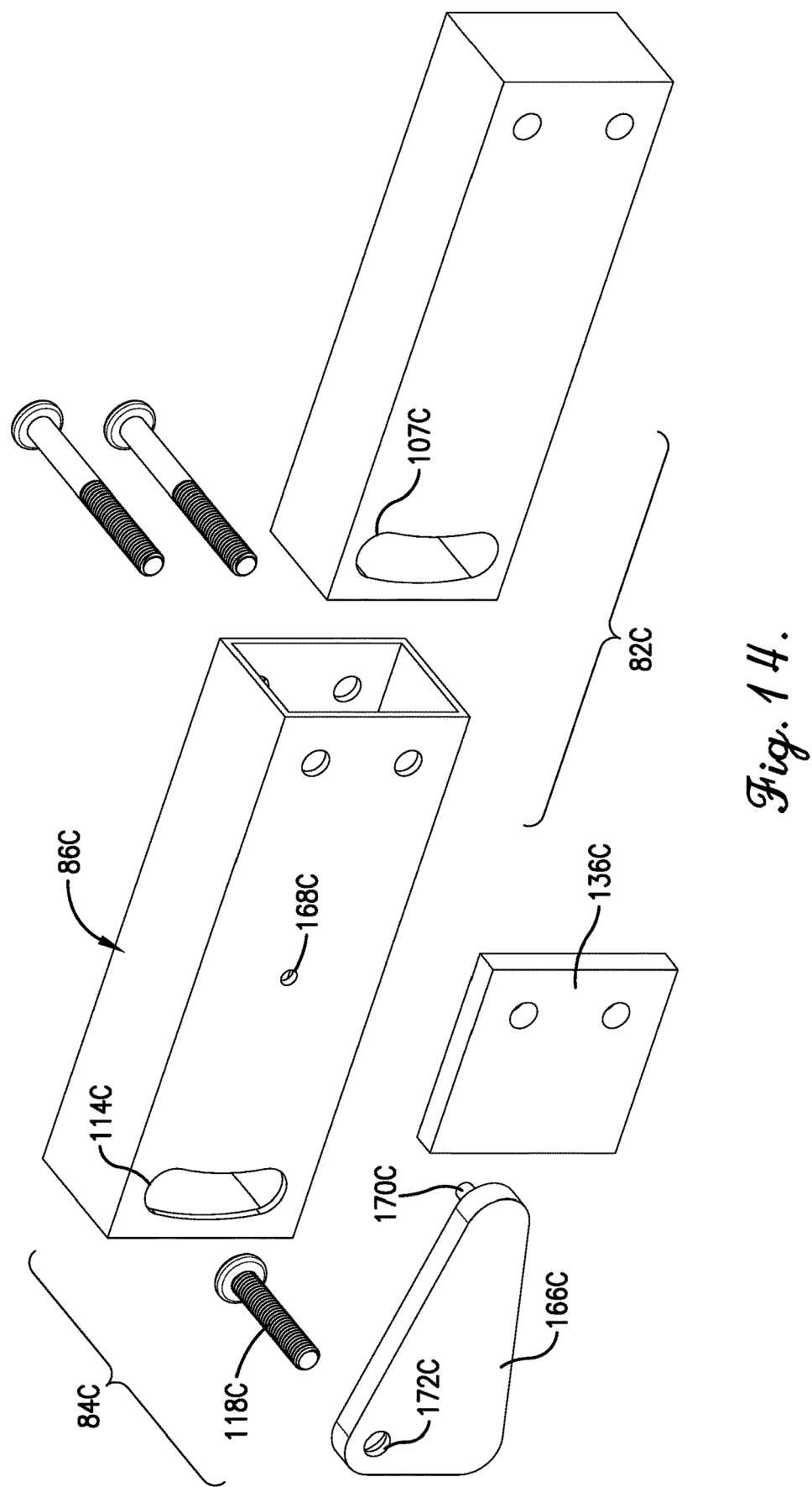
FIG. 14 is an exploded rear view of the enclosure of FIG. 12.

Turning to FIG. 14, the coupling structure 84C includes a slot 114C formed in the back wall 90C of the housing 86C, and the interior material 88C may include a slotted area 107C that is in alignment with the slot 114C when the interior material 88C is positioned within the housing 86C. The slot 114C and slotted area 107C may be operable to allow a portion of the fastener 118C to move about within the enclosure 82C when the tilt link 166C pivots. The slot 114C and slotted area 107C may have arcuate shapes.

The tilt link 166C is pivotally secured to the housing 86C at pivot point 168C. The tilt link 166C may include a pin 170C or the like that pivotally secures the tilt link 166C to the housing 86C. The tilt link 166C may include a hole 172C for receiving the fastener 118C. Fasteners 142C, 144C may also help secure the enclosure 82C to the door 12a and extend through the housing 86C, interior material 88C, and the spacer plate 136C.

Figure 15:
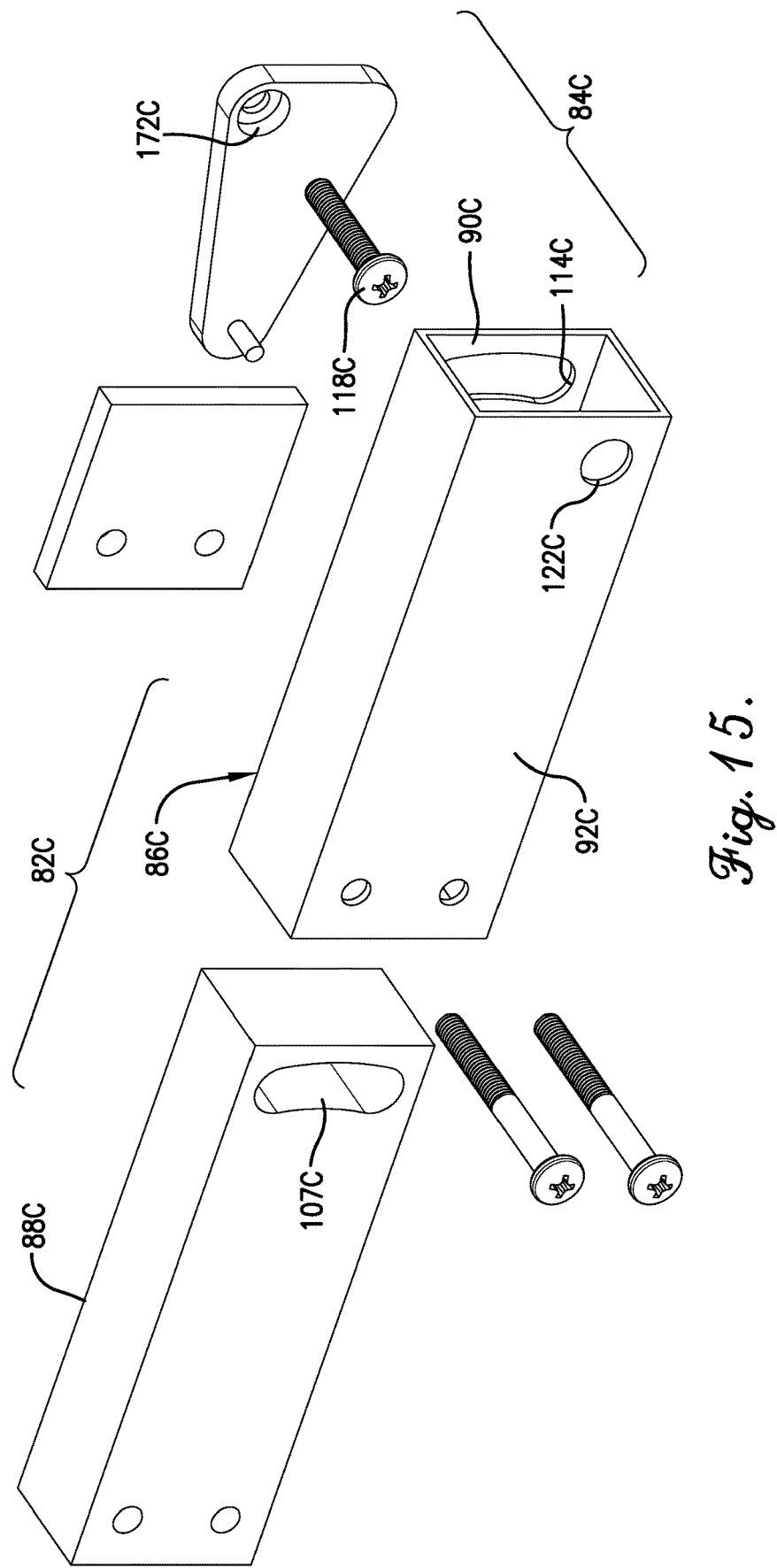
FIG. 15 is an exploded frontal view of the enclosure of FIG. 12.
Figure 16:
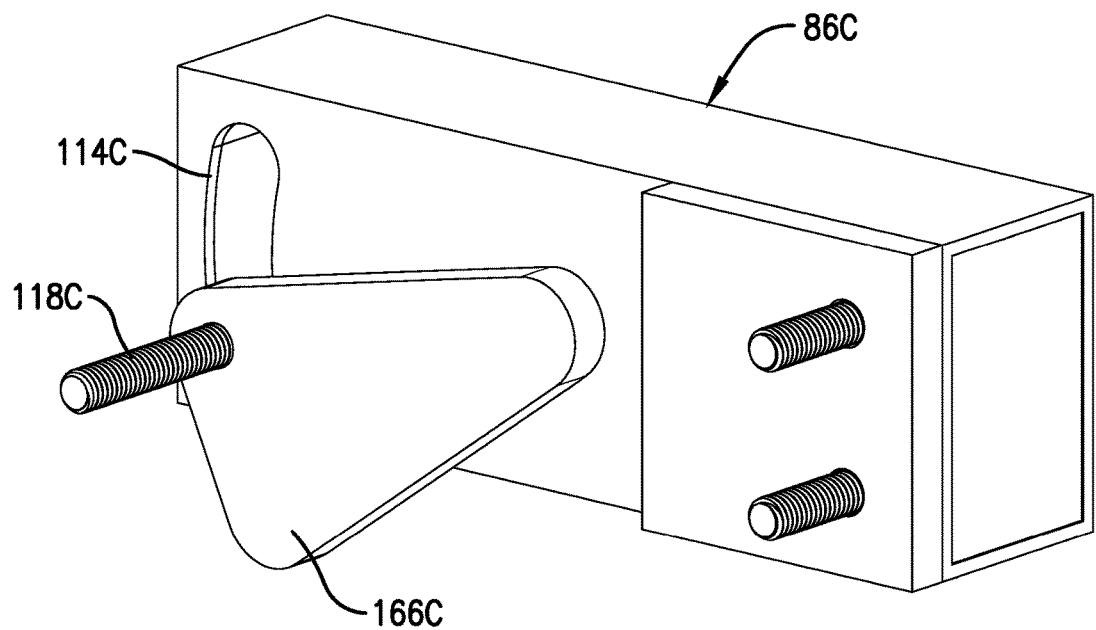
FIG. 16 is a rear perspective view of the enclosure of FIG. 12 with the tilt link at a second position.
Figure 17:
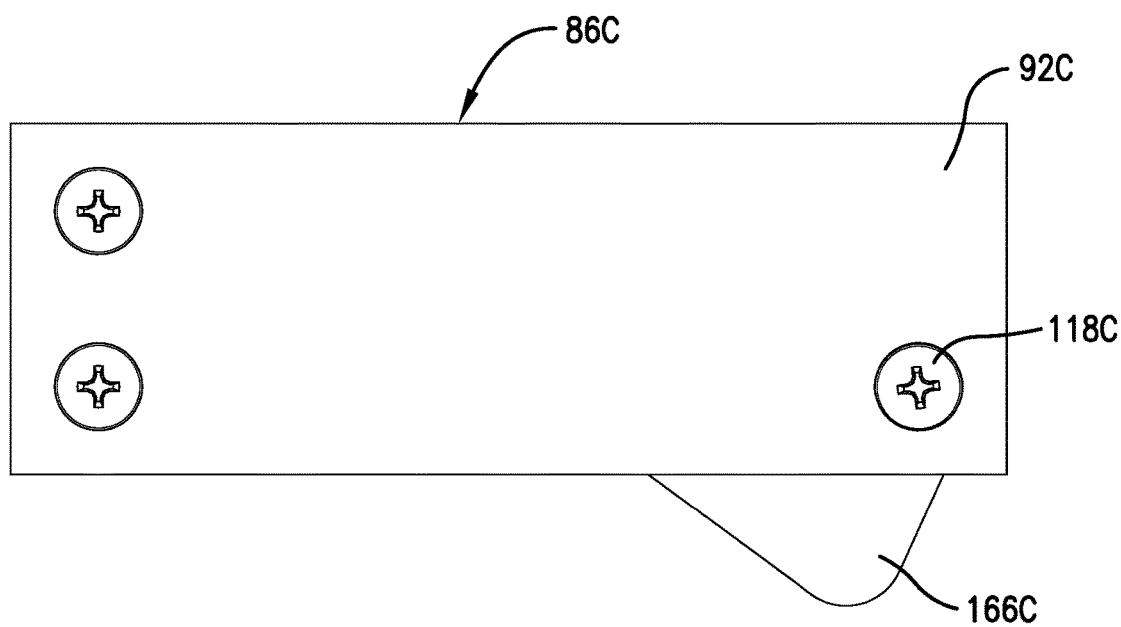
FIG. 17 is a front view of the enclosure of FIG. 12 with the tilt link at the second position.

As shown in FIG. 15, the opening 122C in the front wall 92C of the housing 86C can be aligned with the slot 114C in the back wall 90C of the housing 86C, the slotted area 107C in the interior material 88C (when positioned within the housing 86C), and the hole 172C of the tilt link 166C when the housing 86C and the tilt link 166C are pivoted relative to one another at a pivoted position so that the fastener 118C can be accessed. FIG. 16 depicts the housing 86C and the tilt link 166C in such a pivoted position with the housing 86C pivoted upwards relative the tilt link 166C. As shown in FIG. 16, the fastener 118C is at a bottom portion of the slot 114C. FIG. 17 depicts the housing 86C and the tilt link 166C in the pivoted position as viewed from the front wall 92C of the housing 86C. In the pivoted position, the fastener 118C is accessible through the opening 122C in the front wall 92C of the housing 86C, the slot 114C in the back wall 90C of the housing 86C, and the slotted area 107C in the interior material 88C.

Figure 18:
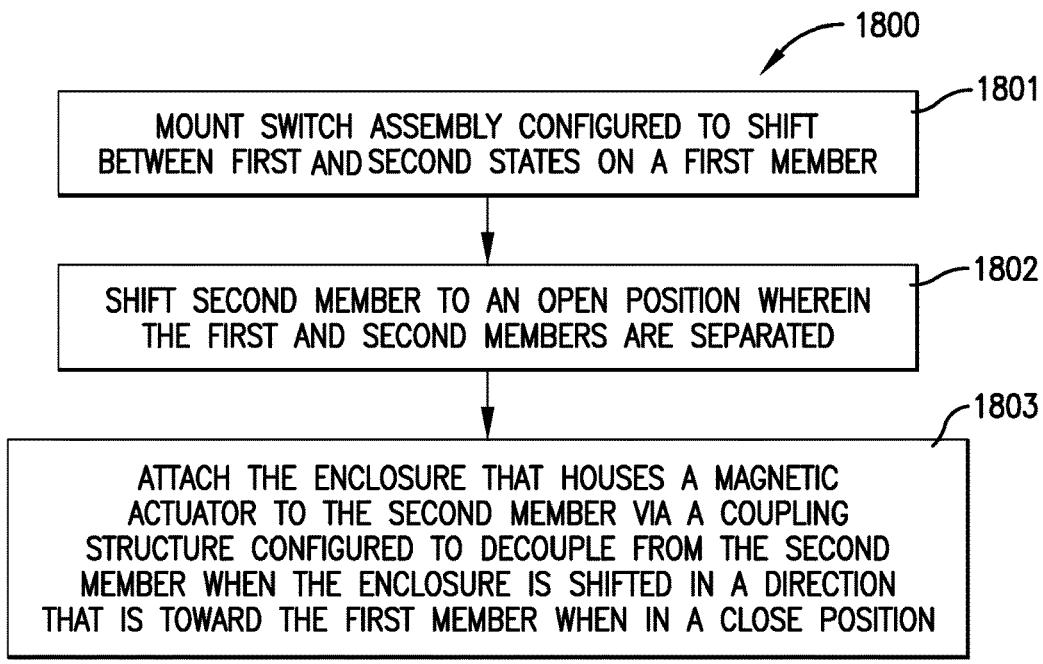
FIG. 18 is a flowchart depicting exemplary steps of a method according to an embodiment of the present invention.

The flow chart of FIG. 18 depicts the steps of an exemplary method 1800 of mounting a magnetic switch apparatus for preventing removal of a magnetic actuator or switch of the magnetic switch apparatus when a first member and a second member are in a close position wherein the first member and the second member are proximal. In some alternative implementations, the functions noted in the various blocks may occur out of the order depicted in FIG. 18. For example, two blocks shown in succession in FIG. 18 may in fact be executed substantially concurrently, or the blocks may sometimes be executed in the reverse order depending upon the functionality involved. In addition, some steps may be optional. The method 1800 is described below, for ease of reference, as being executed by exemplary devices and components introduced with the embodiments illustrated in FIGS. 1-17.

Referring to step 1801, the switch assembly is mounted to a first member. The first member may be a door, doorframe, window, window frame, or the like. As discussed above, the switch assembly is configured to shift between first and second states.

Referring to step 1802, the first and second members are shifted to an open position where the first and second members are separated. Either the first member or the second member may be shifted without departing from the scope of the present invention. For example, if the first member is a doorframe, window frame, or the like, the second member may be a door, window, or the like, or vice versa, with the shifting member being the door, window, or the like.

Referring to step 1803, the enclosure for housing the magnetic actuator is attached to the second member. The magnetic actuator is configured to cause the switch assembly to shift between states when the members are in the close position. The enclosure includes coupling structure configured to decouple from the second member when the enclosure is shifted in a certain direction. The coupling structure is configured so that the enclosure cannot be removed while the assembly is installed on the members and the members are in the close position. Thus, the direction would be toward the switch assembly when the members are in the close position.

In some embodiments, this step includes inserting a fastener into a channel to secure the enclosure to the second member. The channel may include an opening in a back wall of the enclosure with a slot extending therefrom. The slot may extend in a direction toward the other member. This step may include positioning the enclosure so that a head of the fastener or a washer positioned on the fastener may be inserted into the opening, then the enclosure may be shifted downward so that the fastener slides into the slot. This step may also include inserting a second fastener, and when positioning the enclosure, the head of the second fastener may be inserted into a second opening in the back wall of the enclosure with a second slot extending therefrom in a similar direction as the first slot. Thus, when shifting the enclosure downward, both fasteners slide into their respective slots.

In some embodiments, this step may alternatively include before positioning the portion of the first fastener into the first slot in the back wall, positioning the enclosure so that a portion of the second fastener extends into a second slot in the back wall of the enclosure, the second slot extending in a non-parallel direction relative to a length of the first slot and shifting the enclosure so that the portion of the second fastener shifts along the second slot. Then when the enclosure is positioned to receive the first fastener, the enclosure is pivoted about the second fastener so that the first fastener aligns with the first opening and slides into the slot extending from the first opening as the enclosure is pivoted.

In some embodiments, this step may alternatively include inserting the fastener through the fastener hole of the tilt link pivotally attached to the back wall of the enclosure. The enclosure may be shifted upwards (or otherwise away from the second member) so that the fastener hole aligns with the slot in the back wall of the housing, the slotted areas in the interior material, and the opening in the front wall of the housing. The fastener may then be inserted into the fastener hole through the opening in the front wall, the slotted area, and the slot in the back wall. The enclosure may be shifted downwards (or otherwise toward the second member) so that the enclosure pivots relative to the tilt link attached to the second member and so that access to the fastener is blocked by the front wall of the housing of the enclosure.

In some embodiments, this step also includes positioning anti-drilling materials in one or more of the channels via the openings formed in the interior material. The openings are in fluid communication with the channels; thus, the anti-drilling materials prevent access to the fasteners by obstructing the channels.

In some embodiments, the switch assembly may additionally or alternatively be housed in another enclosure having such coupling structure configured to decouple from the member to which the switch assembly is to be mounted when the enclosure is shifted in a direction that would be toward the other member when the members are in close positions. For example, one or more of these steps may be performed in order to secure the switch assembly to the first member.

The method 1800 may include additional, less, or alternate steps and/or device(s), including those discussed elsewhere herein. For example, the method 1800 may include attaching one or more spacer plates to the surface of one or more of the members. Further, additional fasteners may be inserted into the enclosure to help secure the enclosure to its respective member.

Figure 19:
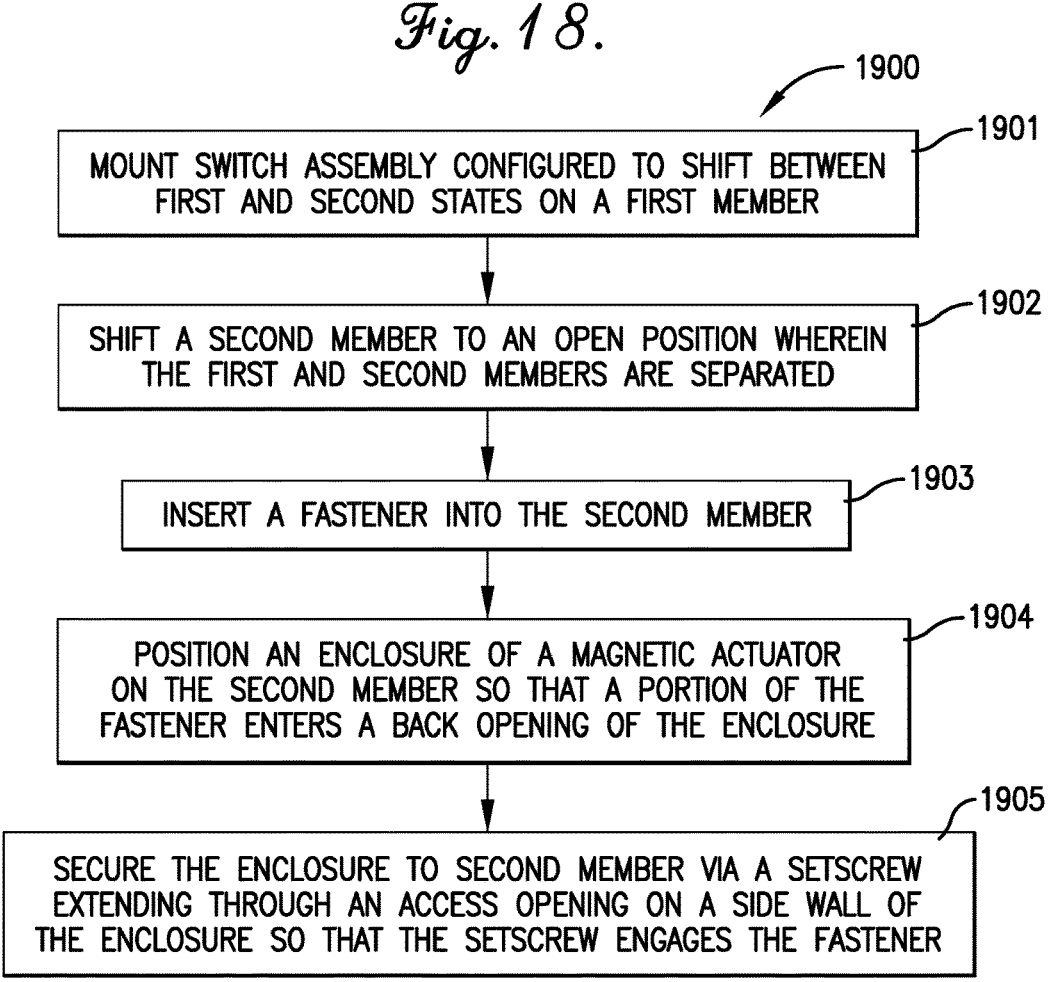
FIG. 19 is a flowchart depicting exemplary steps of a method according to another embodiment of the present invention.

The flow chart of FIG. 19 depicts the steps of an exemplary method 1900 of mounting a magnetic switch apparatus for preventing removal of a magnetic actuator or switch of the magnetic switch apparatus when a first member and a second member are in a close position wherein the first member and the second member are proximal. In some alternative implementations, the functions noted in the various blocks may occur out of the order depicted in FIG. 19. For example, two blocks shown in succession in FIG. 19 may in fact be executed substantially concurrently, or the blocks may sometimes be executed in the reverse order depending upon the functionality involved. In addition, some steps may be optional. The method 1900 is described below, for ease of reference, as being executed by exemplary devices and components introduced with the embodiments illustrated in FIGS. 1-17.

Referring to step 1901, a switch assembly is mounted to a first member. The first member may be a door, doorframe, window, window frame, or the like. The switch assembly is configured to shift between first and second states.

Referring to step 1902, the first and second members are shifted to an open position where the first and second members are separated. Either the first member or the second member may be shifted without departing from the scope of the present invention. For example, if the first member is a doorframe, window frame, or the like, the second member may be a door, window, or the like, or vice versa, with the shifting member being the door, window, or the like.

Referring to step 1903, one or more fasteners are inserted into the second member. The fasteners may be inserted into the spacer plate and secure the spacer plate to the second member. The fasteners may include collars that are sandwiched between the fastener heads and the spacer plate. Each of the collars may include circumferentially extending grooves for receiving one of the set screws.

Referring to step 1904, an enclosure housing the magnetic actuator is positioned on the second member so that portions of the fasteners enter back openings in the enclosure. The back openings may be openings formed in the back wall of the housing of the enclosure. The enclosure may further have positioned therein the interior material with slotted areas for allowing the fasteners and collars to be inserted within the housing. Thus, the positioning of the enclosure may include positioning the enclosure so that the portions of the fasteners and the collars enter the slotted areas within the housing.

Referring to step 1905, the enclosure is secured to the second member via one or more of the setscrews. This step may include fastening one or more of the setscrews so that they extend through the access openings formed in the side wall of the enclosure. The setscrews may be inserted into the access openings and fastened until they engage the fasteners and/or the collars on the fasteners. In some embodiments, the setscrews may engage points on the grooves extending circumferentially around the collars. The setscrews may be inserted into the openings formed in the side wall of the enclosure so that when the members are in close positions with the magnetic switch apparatus installed, the side wall faces the other member and/or the switch assembly. That way, when in the close position, access to the setscrews is inhibited by the switch assembly, such as by the housing of the switch assembly. The setscrews may be fastened until they are flush with the top surface of the side wall or sunken below the top surface.

The method 1900 may include additional, less, or alternate steps and/or device(s), including those discussed elsewhere herein. For example, the method 1900 may additionally or alternatively include housing the switch assembly in an enclosure with similar or other coupling structure.

ADDITIONAL CONSIDERATIONS

Although the present application sets forth a detailed description of numerous different embodiments, it should be understood that the legal scope of the description is defined by the words of the claims set forth in any subsequent regular utility patent application. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. A magnetic switch apparatus for detecting relative movement between a first member and a second member from a close position wherein the first member and the second member are proximal, and an open position wherein the first member and the second member are separated, the magnetic switch apparatus comprising:
   a switch assembly for mounting on the first member and configured to shift between a first state and a second state;
   a magnetic actuator for mounting on the second member and configured to shift the switch assembly between the first state and the second state when the first member and the second member are in the open position; and
   an enclosure for housing one of the switch assembly or the magnetic actuator on the first member or the second member, the enclosure including a coupling structure configured to decouple from one of the first member or the second member when at least a portion of the enclosure is shifted in a direction away from the one of the first member or the second member, the direction being at least partially toward the other one of the first member or the second member when the first member and the second member are in the close position,
   wherein the housing includes a side wall facing the direction and a back wall, and the coupling structure comprises a slot formed in the back wall and extending toward the side wall.

2. The magnetic switch apparatus of claim 1, wherein the enclosure comprises an open-ended housing and an interior material positionable within the housing, the coupling structure comprising—
 a channel extending through at least a portion of the open-ended housing and the interior material for receiving a fastener for securing the enclosure to one of the first member or the second member,
 an opening formed in the interior material that is in fluid communication with the channel, and
 an anti-drilling material operable to be positioned in the channel via the opening.

3. The magnetic switch apparatus of claim 2, wherein the housing includes a back surface for positioning proximate to one of the first member or the second member and a front surface spaced apart from the back surface, and the channel extends from the front surface to the back surface so that the fastener can be accessed at the front surface when the anti-drilling material is removed.

4. The magnetic switch apparatus of claim 1, wherein the slot is a first slot, and the coupling structure further comprises a second slot formed in the back wall and extending toward the side wall.

5. The magnetic switch apparatus of claim 1, wherein the slot is a first slot, and the coupling structure further comprises a second slot formed in the back wall extending in a direction that is not parallel to the first slot.

6. The magnetic switch apparatus of claim 1, wherein the enclosure includes a front wall connected to the side wall and spaced apart from the back wall, and the coupling structure comprises—
 an access hole formed in the front wall at a distance from the side wall, and
 a tilt link pivotally attached to the back wall and including a fastener hole that aligns with the slot of the back wall and the access hole when the tilt link pivots away from the side wall.

7. A magnetic switch apparatus for detecting relative movement between a first member and a second member from a close position wherein the first member and the second member are proximal, and an open position wherein the first member and the second member are separated, the apparatus comprising:
 a switch assembly for mounting on the first member and configured to shift between a first state and a second state;
 a magnetic actuator for mounting on the second member and configured to shift the switch assembly between the first state and the second state when the first member and the second member are in the open position; and
 an enclosure for housing one of the switch assembly or the magnetic actuator and including an open-ended housing, an interior material positionable within the housing, and coupling structure configured to couple to the first member or the second member, the coupling structure comprising—
  a channel extending through at least a portion of the housing and the interior material for receiving a fastener for securing the enclosure to one of the first member or the second member,
  an opening formed in the interior material that is in fluid communication with the channel, and
  an anti-drilling material operable to be positioned in the channel via the opening.

8. The magnetic switch apparatus of claim 7, wherein the housing includes a back wall for positioning proximate to the first member or the second member, the coupling structure including a slot formed in the back wall and that extends from the channel toward the other one of the first member or the second member when the first member and the second member are in the close position.

9. The magnetic switch apparatus of claim 7, wherein the channel is a first channel, the opening is a first opening, the anti-drilling material is a first anti-drilling material, and the coupling structure further comprises—
 a second channel extending through at least a portion of the housing and the interior material for receiving a fastener for securing the enclosure to one of the first member or the second member and spaced apart from the first channel,
 a second opening in the interior material that is in fluid communication with the second channel, and
 a second anti-drilling material operable to be positioned in the second channel via the second opening.

10. A magnetic switch apparatus for detecting relative movement between a first member and a second member from a close position wherein the first member and the second member are proximal, and an open position wherein the first member and the second member are separated, the apparatus comprising:
 a switch assembly for mounting on the first member and configured to shift between a first state and a second state;
 a magnetic actuator for mounting on the second member and configured to shift the switch assembly between the first state and the second state when the first member and the second member are in the open position; and
 an enclosure for housing one of the switch assembly or the magnetic actuator, the enclosure including—
  a back wall for positioning proximate to one of the first member or the second member, and
  a side wall that faces toward the other one of the first member or the second member when the first member and the second member are in the close position, and
 coupling structure for securing the enclosure to the first member or the second member, the coupling structure comprising—
  a back opening formed in the back wall,
  a fastener for securing to one of the first member or the second member and including a portion for extending into the back opening,
  an access opening formed in the side wall, and
  a setscrew configured to extend into the access opening and engage the portion of the fastener.

11. The magnetic switch apparatus of claim 10, wherein the portion of the fastener includes a collar with a circumferentially extending groove for receiving the setscrew.

12. The magnetic switch apparatus of claim 10, wherein the enclosure includes a front wall opposing the back wall and covering the back opening.

13. The magnetic switch apparatus of claim 10, wherein the setscrew includes a top surface and has a length such that when the setscrew is engaged to the portion of the fastener, the top surface is flush with the side wall or within the access opening.

14. A magnetic switch apparatus for detecting relative movement between a first member and a second member from a close position wherein the first member and the second member are proximal, and an open position wherein the first member and the second member are separated, the apparatus comprising:
 a switch assembly configured to shift between a first state and a second state;

a first enclosure for mounting on the first member and housing the switch assembly;

a magnetic actuator configured to shift the switch assembly between the first state and the second state when the first member and the second member are in the open position; and a second enclosure for mounting on the second member and housing the magnetic actuator, the second enclosure including a coupling structure configured to decouple from the second member when at least a portion of the second enclosure is shifted in a direction away from the second member, the direction being at least partially toward the first enclosure when the first member and the second member are in the close position so that the second enclosure abuts the first enclosure, thereby preventing the coupling structure from decoupling from the second member when the first member and the second member are in the close position, wherein the second enclosure includes a side wall facing the first enclosure when the first member and the second member are in the close position, and a back wall, the coupling structure further comprising a slot formed in the back wall and extending toward the side wall.

15. The magnetic switch apparatus of claim 14, wherein the second enclosure comprises an open-ended housing and an interior material positionable within the housing, the coupling structure comprising— a channel extending through at least a portion of the open-ended housing and the interior material for receiving a fastener for securing the second enclosure to the second member, an opening formed in the interior material that is in fluid communication with the channel, and an anti-drilling material operable to be positioned in the channel via the opening.

16. The magnetic switch apparatus of claim 15, wherein the housing includes a back surface for positioning proximate to the second member and a front surface spaced apart from the back surface, and the channel extends from the front surface to the back surface so that the fastener can be accessed from the front surface when the anti-drilling material is removed.

17. The magnetic switch apparatus of claim 14, wherein the slot is a first slot, and the coupling structure further comprises a second slot formed in the back wall and extending toward the side wall.

18. The magnetic switch apparatus of claim 14, wherein the slot is a first slot, and the coupling structure further comprises a second slot formed in the back wall and extending in a direction that is not parallel to the first slot.

19. The magnetic switch apparatus of claim 14, wherein the second enclosure includes a front wall connected to the side wall and spaced apart from the back wall, the coupling structure further comprising— an access hole formed in the front wall at a distance from the side wall, and a tilt link pivotally attached to the back wall and including a fastener hole that aligns with the slot formed in the back wall and the access hole when the tilt link pivots away from the side wall.

20. A magnetic switch apparatus for detecting relative movement between a first member and a second member from a close position wherein the first member and the second member are proximal, and an open position wherein the first member and the second member are separated, the apparatus comprising:

a switch assembly configured to shift between a first state and a second state;

a first enclosure for mounting on the first member and housing the switch assembly;

a magnetic actuator configured to shift the switch assembly between the first state and the second state when the first member and the second member are in the open position; and a second enclosure for housing the magnetic actuator and including an open-ended housing, an interior material slidably held within the housing, and coupling structure for coupling to the second member, the coupling structure including— a channel extending through at least a portion of the open-ended housing and the interior material for receiving a fastener for securing the second enclosure to the second member, an opening formed in the interior material that is in fluid communication with the channel, and an anti-drilling material operable to be positioned in the channel via the opening.

21. The magnetic switch apparatus of claim 20, wherein the housing includes a back wall for positioning proximate to the second member, the coupling structure comprising a slot formed in the back wall and extending from the channel toward the first enclosure when the first member and the second member are in the close position.

22. The magnetic switch apparatus of claim 20, wherein the channel is a first channel, the opening is a first opening, the anti-drilling material is a first anti-drilling material, and the coupling structure further comprises— a second channel extending through at least a portion of the open-ended housing and the interior material for receiving a fastener and spaced apart from the first channel, a second opening formed in the interior material that is in fluid communication with the second channel, and a second anti-drilling material operable to be positioned in the second channel via the second opening.

23. A magnetic switch apparatus for detecting relative movement between a first member and a second member from a close position wherein the first member and the second member are proximal, and an open position wherein the first member and the second member are separated, the apparatus comprising:

a switch assembly configured to shift between a first state and a second state;

a first enclosure for mounting on the first member and housing the switch assembly;

a magnetic actuator configured to shift the switch assembly between the first state and the second state when the first member and the second member are in the open position; and a second enclosure for housing the magnetic actuator and including— a back wall for positioning proximate to the second member, a side wall facing the first enclosure when the first member and the second member are in the close position, and coupling structure for coupling to the second member, the coupling structure comprising— a back opening formed in the back wall, a fastener for securing to the second member and including a portion for extending into the back opening, an access opening formed in the side wall, and a setscrew configured to extend into the access opening and engage the portion of the fastener.

24. The magnetic switch apparatus of claim 23, wherein the portion of the fastener includes a collar with a circumferentially extending groove for receiving the setscrew.

25. The magnetic switch apparatus of claim 23, wherein the second enclosure includes a front wall opposing the back wall and covering the back opening.

26. The magnetic switch apparatus of claim 23, wherein the setscrew includes a top surface and has a length such that when the setscrew is engaged to the portion of the fastener, the top surface is flush with the side wall or within the access opening.

27. A method of mounting a magnetic switch apparatus for preventing removal of a magnetic actuator of the magnetic switch apparatus when a first member and a second member are in a close position wherein the first member and the second member are proximal, the method comprising:

mounting a switch assembly configured to shift between a first state and a second state on the first member;

shifting the first member or the second member to an open position wherein the first member and the second member are separated; and attaching an enclosure that houses the magnetic actuator to the second member, the enclosure being attached via a coupling structure configured to decouple from the second member when at least a portion of the enclosure is shifted in a first direction away from the second member, the first direction being at least partially toward the first member when the first member and the second member are in the close position, wherein the enclosure is attached by:

inserting a fastener into the second member;

positioning the enclosure so that a portion of the fastener extends into a slot in a back wall of the enclosure; and shifting the enclosure in a second direction opposite of the first direction.

28. The method of claim 27, further comprising— inserting a fastener into a channel to secure the enclosure to the second member; and positioning an anti-drilling material in the channel via an opening formed in an interior material within the enclosure, the opening being in fluid communication with the channel.

29. The method of claim 27, wherein the fastener is a first fastener, the slot is a first slot, the attaching step comprises— inserting a second fastener spaced apart from the first fastener into the second member, before positioning the portion of the first fastener into the first slot in the back wall, positioning the enclosure so that a portion of the second fastener extends into a second slot in the back wall of the enclosure, the second slot extending in a non-parallel direction relative to a length of the first slot, and shifting the enclosure so that the portion of the second fastener shifts along the second slot.

30. The method of claim 29, wherein the shifting the enclosure in the second direction comprises pivoting the enclosure about the second fastener.

31. The method of claim 27, wherein the attaching step comprises inserting the fastener through a fastener hole of a tilt link pivotally attached to a back wall of the enclosure.

32. A method of mounting a magnetic switch apparatus for preventing removal of a magnetic actuator of the magnetic switch apparatus when a first member and a second member are in a close position wherein the first member and the second member are proximal, the method comprising:

mounting a switch assembly configured to shift between a first state and a second state on the first member;

shifting the first member or the second member to an open position wherein the first member and the second member are separated;

positioning an enclosure of the magnetic actuator on the second member;

securing the enclosure to the second member via a fastener extending through and formed in a back wall of the enclosure; and inserting an anti-drilling material in a channel in fluid communication with an opening formed in the back wall via an opening formed in an interior material held within the enclosure.

33. The method of claim 32, wherein the positioning step includes positioning the enclosure so that a portion of the fastener extends into a slot extending from the channel toward the first member when the first member and the second member are in the close position.

34. A method of mounting a magnetic switch apparatus for preventing removal of a magnetic actuator of the magnetic switch apparatus when a first member and a second member are in a close position wherein the first member and the second member are proximal, the method comprising:

mounting a switch assembly configured to shift between a first state and a second state on the first member;

shifting the first member or the second member to an open position wherein the first member and the second member are separated;

inserting a fastener into the second member;

positioning an enclosure of the magnetic actuator on the second member so that a portion of the fastener enters a back opening of the enclosure; and securing the enclosure to the second member via a setscrew extending through an access opening on a side wall of the enclosure so that the setscrew engages the fastener, the side wall facing the first member when the first member and the second member are in the close position.

35. The method of claim 34, wherein the securing step includes fastening the setscrew until a top surface of the setscrew is flush with the side wall or within the access opening.

* * * * *